United States Patent [19]

Beckwith

[11] Patent Number: 5,463,856
[45] Date of Patent: Nov. 7, 1995

[54] WHOLE STALK SUGAR CANE HARVESTER THAT TOPS, CUTS, CLEANS AND LOADS

[75] Inventor: Carlos A. Beckwith, Querétaro, Mexico

[73] Assignee: Centro de Investigacion Y Asistencia Tecnica del Estado de Wueretaro A.C., Queretaro, Mexico

[21] Appl. No.: 245,836

[22] Filed: May 19, 1994

Related U.S. Application Data

[63] Continuation of Ser. No. 968,075, Oct. 29, 1992, abandoned.
[51] Int. Cl.$^6$ ..................................... A01D 45/10
[52] U.S. Cl. ................... 56/62; 56/63; 56/122; 460/134
[58] Field of Search ................ 56/122, 62, 63, 56/121.43, 121.44, 121.46, 14.5, 14.6; 460/105, 106, 134, 137, 23, 24, 119

[56] References Cited

U.S. PATENT DOCUMENTS

| | | | |
|---|---|---|---|
| 4,008,557 | 2/1977 | Ruback et al. | 56/63 |
| 4,099,365 | 7/1978 | Hudson | 56/16.6 X |
| 4,408,441 | 10/1983 | Willett | 56/59 X |
| 4,483,129 | 11/1984 | Lester | 56/13.9 |
| 4,483,130 | 11/1984 | Duncan | 56/14.3 |
| 4,677,813 | 7/1987 | Stiff et al. | 56/13.9 |
| 5,157,904 | 10/1992 | Otten et al. | 56/14.3 X |
| 5,191,759 | 3/1993 | Baker | 56/53 X |
| 5,255,500 | 10/1993 | von Allwoerden | 56/63 |
| 5,303,533 | 4/1994 | Caillouet | 56/14.3 |

Primary Examiner—Terry Lee Melius
Attorney, Agent, or Firm—Finnegan, Henderson, Farabow, Garrett & Dunner

[57] ABSTRACT

The invention provides self propelled harvester that tops, cuts, cleans and loads "whole stalk green sugar cane".

The canes are flexed forward by the movement of the harvester by means of a roller, while the base is cut with a pair of counter rotating disk cutters per row. The base cutters automatically follow the level of the ground using by spherically dished sliders pivotably connected to cutter shafts. The topped canes, with attached green and dry leaves are fed gently but firmly into the front section of the machine through a single, full width, large 100 dm2 throat, helped by vertical and-horizontal rubber rollers. By the action of the rotation of preferably three pairs of rollers and paddles, rocks, tramp iron, cans, bottles, soil, and mud, fall through the paddles, and through grizzlies back to the ground; all materials over 0.05 Mt. are retained by the grizzlies, which can be emptied at the operators choice. Inside the body of the harvester, bellow and above the cane, a series of special rubber rollers that continuously increase in peripheral speed, spreads and advances the cane. As the cane proceeds further and faster into the harvester's body, all leaves are detached, and eventually fall through the rollers and brushes to a conveyor that is moving up, on the bottom of the harvester's body; this conveyor empties through an opening of the body. The clean cane at a adjustable speed from 7 to 9 Mt./sec is discharged from the rear of the body at an elevation to fill a semitrailer hitched behind of the prime mover.

20 Claims, 23 Drawing Sheets

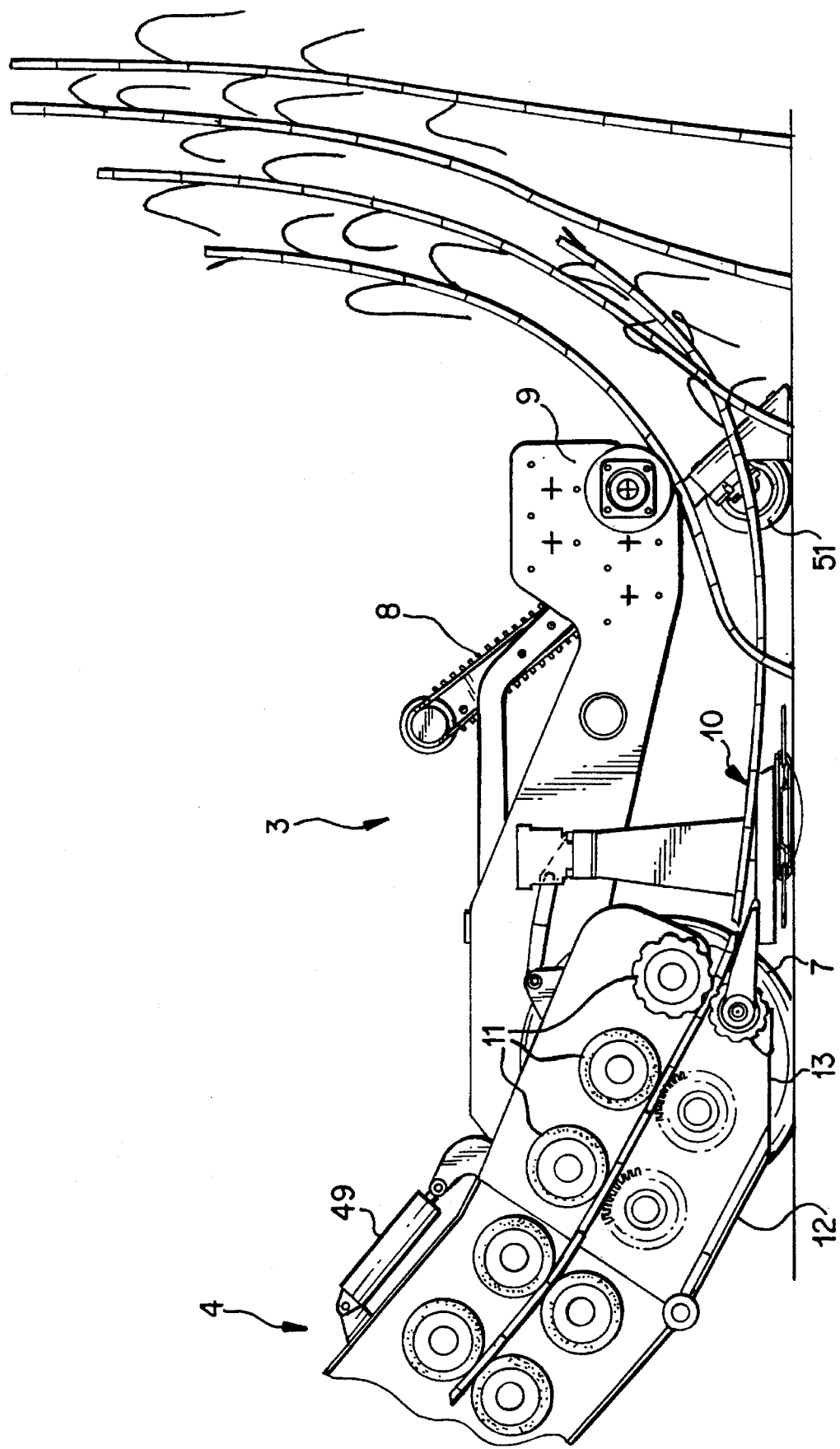

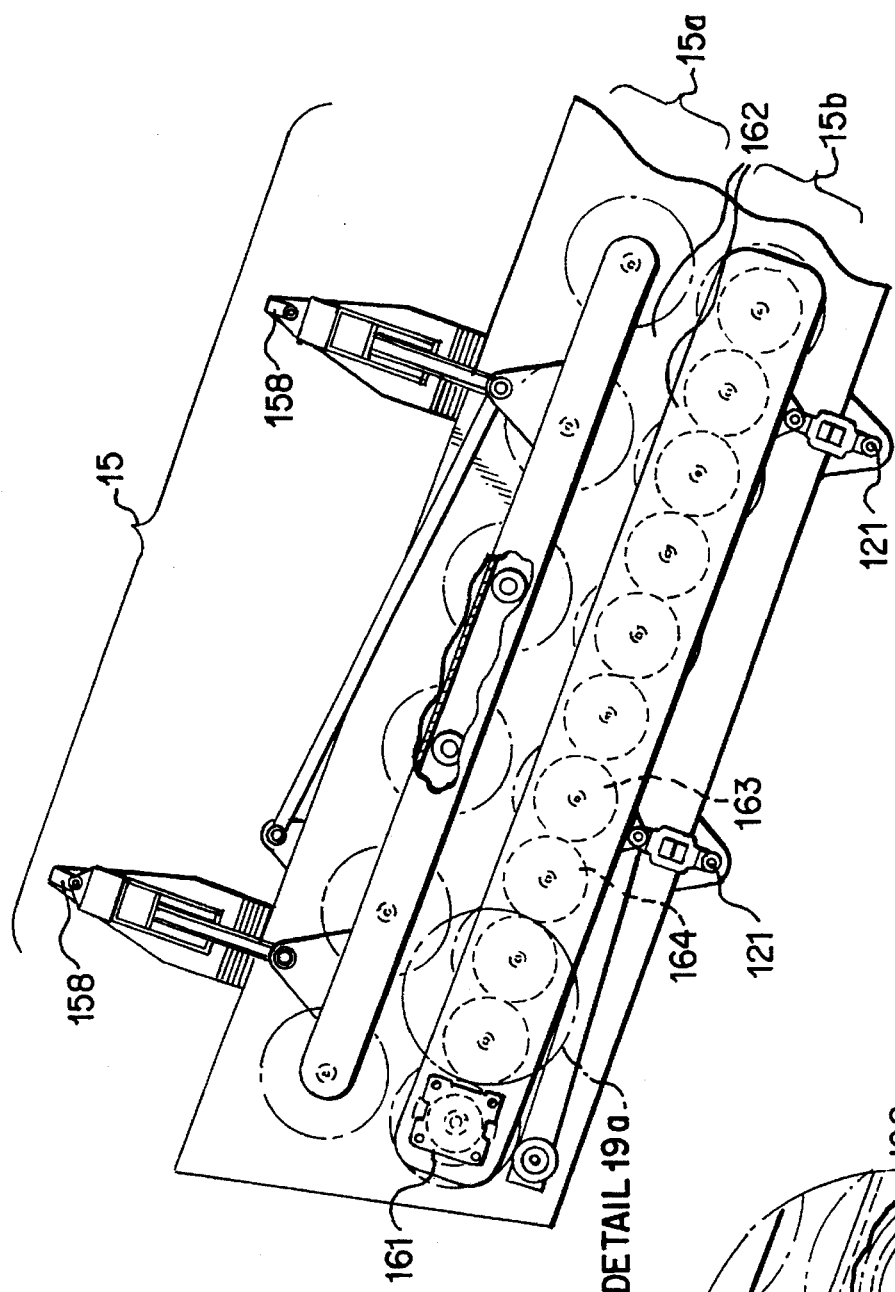
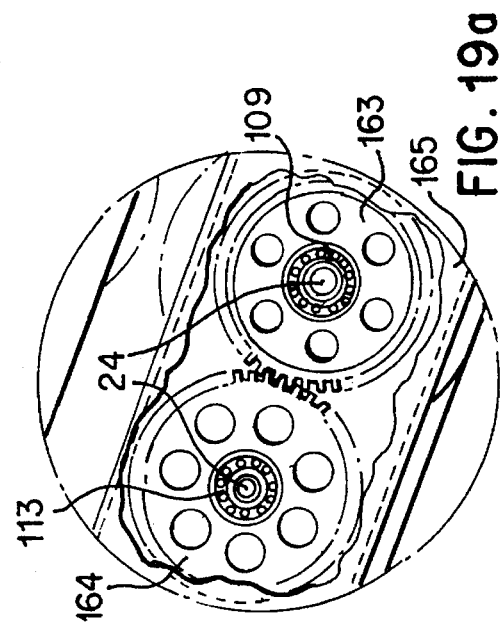
FIG. 19
FIG. 19a

WHOLE STALK SUGAR CANE HARVESTER THAT TOPS, CUTS, CLEANS AND LOADS

This application is a continuation of application Ser. No. 07/968,075 filed Oct. 29, 1992, now abandoned.

BACKGROUND OF THE INVENTION

The present invention relates to a self propelled harvester that tops, cuts, cleans and loads "whole stalk green sugar cane".

The universal practice of burning the sugar cane fields as an operation before harvesting, was a means of easing harvest tasks and to remove the dry, non sugar-carrying botanical components. The modern outlook on trash has changed significantly: (a) their pre harvest removal is not needed nor desired; (b) such biomass "trash" burning is desired in the furnace, not in the field; (c) trash removed that can be solar dried should be separated and left on the field for a later pickup after a few days; (d) the dewatered trash does not need to be milled and should be managed independently once separated from the whole cane; (e) though trash is important and contributes materially to the total whole cane harvest, its management must be rated at a lower priority than the whole cane harvest; (f) the overriding concern is to harvest the greater possible quantity of biomass having the highest possible quality of lignocellulose feedstock; (g) it is a low grade fate for lignocellulose trash to be burned in boilers along with humid bagasse; (h) total biomass rather than sucrose is the ultimate goal and this fact should not be lost from view.

The above guidelines taken together are not easily met, the sugar industry has been unable for ) years to comply with stringent set of cane quality standards, let alone of the biomass guidelines. Two basic types of harvest machines have lxn developed since the early 1950's: (a) The cutting off of the stem and depositing the cane on the ground, and (b) the combined cutting, chopping (in short segments) and loading into an enclosed carrier for transport. The former type delivers excessive extraneous matter, the latter is costly, highly-consumptive of fuel due to the power necessary for the chopping and the power for the fans for the trash separation, also, the chopped material is subject to more rapid biodeterioration. Both types have a limited throughput of 100 Tons per hour.

SUMMARY OF THE INVENTION

The present invention relates to a new and improved whole cane harvester. As discussed, the sugar cane harvesters in current use have serious inconveniences in cost and operation. In the present invention, the problems are solved due to important characteristics of handling the cane and the biomass: The cane's tops are cut and windrowed for solar drying on the side already harvested. The bas cutting of the cane is close to the ground due to an improved automatic height cutter, that prevents the cutters from digging into the ground and taking in soil and rocks. Said machine harvests "whole cane stalk" which saves the cane from rapid biodeterioration and their associated sucrose losses, allows the biomass to be saved for other uses, instead wasting it and contributing to existing ambient pollution. The unique detachment of the biomass from the stalk is by means of gentle but firm friction caused by multiple top and bottom brushes and rubber rolls that continuously increase peripheral speed from ground velocity to 8 Mt./sec, as the cane increases speed due to the combined action of both top and bottom rollers and brushes, the cane is conveyed in tension at an average speed from all the rollers or brushes in contact with the stalk, hence the friction is greater at both ends of the cane, which is what is needed in order to detach the green leaves at the top of the stalk and the attached mud on the lower end of the cane. The clean cane exits the main body to load a semitrailer hitched to the rear of the prime mover, that when full, loads other vehicle. The cane, from cutting to milling, never makes contact with the ground. The rocks encountered, fall through the first rollers, are separated and disposed off, instead of returning them to the ground from being encountered during subsequent harvesting operations.

The present invention relates to a harvester that tops, cuts, cleans and loads "whole stalk green sugar cane". It is an object of the present invention to treat the "entire plant" as a valuable commodity with the modern outlook that has changed significantly: (a) pre-harvest removal of dry non-sugar carrying botanical components by burning the sugar fields, is not needed nor desired; (b) trash burning is desired in the furnace, not in the field; (c) trash removed that can be solar dried should be separated and left in the field for later pickup after a few days; (d) the dewatered trash does not need to be milled and should be managed independently once separated from the whole stalk; (e) though trash is important and contributes materially to the total whole green cane harvest, its management must be rated at a lower priority than the whole cane harvest; (f) the overriding concern is to harvest the greater possible quantity of biomass having the highest possible quality of lignocellulose feedstock; (g) it is a low grade fate for lignocellulose trash to be burned in boilers along with humid bagasse; (h) total biomass rather that only sucrose is the ultimate goal and this fact should not be lost from view.

The objective of the present invention is to increase the quality of whole cane and biomass to be free from loose soil and adhering mud, that could impair its milling, processing and utilization. The cane's tops are cut and windrowed for solar drying on the side already harvested. The basis for quality is a good base cut, which is accomplished by flexing the canes forward by the movement of harvester by means of a front roller, while the cane is cut at its base with a pair of counter rotating disk cutters per row. The base cutters automatically follow closely the level of the ground, in order to cut close to it but without sinking the blades into the ground which could introduce soil and rocks into the harvester. A further objective of the present invention is to provide a high throughput, from 100 to 150 ton/hr, with no injure to the cane, in order to preserve it from rapid biodeterioration. After being topped and cut at the base, the canes with the attached green and dry leaves are fed into the body of the harvester through a single, full width, large 100 dm2 throat, helped by the front roller, the base cutters, two vertical rubber rollers, a bottom feeder rubber roller and top adjustable feeder rubber roller, aided preferably by two more pairs of feeder rollers; and due to the same action of the brushes and rubber rollers, all operating with a peripheral speed above ground speed, rocks, tramp iron, cans, bottles and soil, fall through the brushes and around the rubber rollers, and through grizzlies back to the ground; all materials over 0.05 Mt. are retained by the grizzlies, which can be emptied at the operators choice of place.

The primary cleaning rollers are comprised preferably of twelve pair of rubber rollers. Below and above the cane, a series of special rubber rollers arranged in pairs, come in contact with the cane, each roller at a particular pair with the same counter rotating peripheral speed, but increasing its linear velocity from one pair to the next pair, causing said cane to spreads and advance. As the respective cane portions are acted on by the increasing velocity due to the combined action of upper and bottom rubber in successive rollers pairs, the cane is conveyed in tension at the average speed of all the rollers in contact with the cane, the slip is greater in the ends of the stalk, hence the work of friction is increased at the ends, by this effect, exclusive of this invention causes to detach the green leaves at the top and the attached mud on the lower end of the stalk.

The secondary cleaning rollers of the harvester are comprised preferably of six pairs of rubber rollers, since by this time most of the leaves have been detached, a second type of action takes place in this section: the rollers keep a constant linear speed, but with different speed between top and bottom rollers. This speed ratio can be adjusted for different types of cane, from pure conveying to intense erosion along the entire length of the cane. In order to use the proper velocity of the stalk to load the side dump semitrailer hitched to the rear of the prime mover, the peripheral speed of this last group of rollers, can be varied by the operator.

During all the cleaning period, all leaves detached from the stalk fall through the rubber rollers to a conveyor moving down on the bottom of the harvester's body. This conveyor empties through an opening of the main body. The few leaves that still are within the stalk, fall to the ground during the flight of the clean stalk through air and into the semitraile hitched to the rear of the prime mover.

BRIEF DESCRIPTION OF THE DRAWINGS

FIG. 5 Section showing main components, Front Section.

FIG. 8b Top View, Base Cutter

FIG. 17A Detail of Adjustment Mechanism

FIG. 19 Right Side View of Secondary Cleaning Rollers.

FIG. 19A Detail of Driving Gears

FIG. 20b Top View of Special Semitrailer.

FIG. 20d Detail of the interconnection between rods 191 and solenoids 192 in the apparatus of FIG. 20a.

DETAILED DESCRIPTION OF THE INVENTION

The description of the invention relates to a system including a self propelled harvester that cuts, cleans and loads "whole stalk green sugar cane", that treats the "entire plant" as a valuable commodity, that does not reduce the subsequent crop's potential by damaging the seed bed and crowns; that retain the biomass for burning in the furnace, not in the field; that keeps the harvested cane free from soil, mud and rocks, that could impair its milling, processing and utilization; harvest the greater possible quantity of biomass having the highest possible quality of lignocelulose feedstock. The total biomass harvested rather that sucrose is the ultimate goal of the invention to save energy and reduce pollution.

Figure 1:
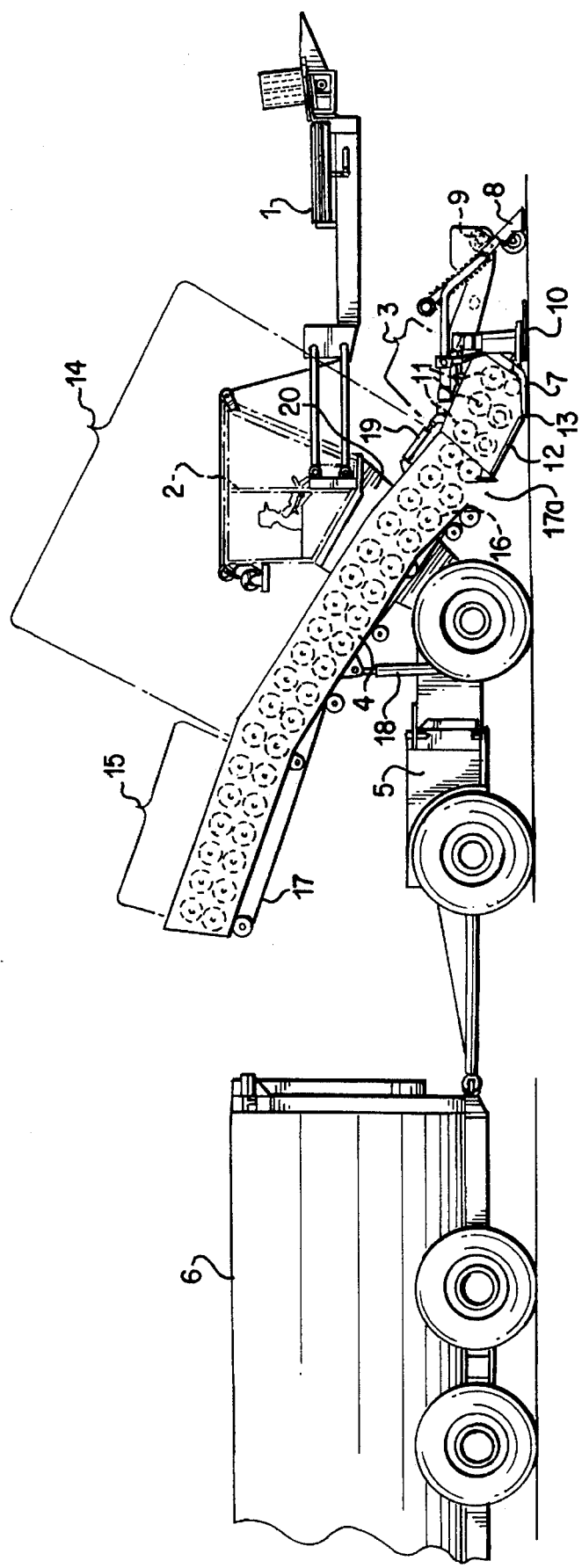
FIG. 1 General Side View.
Figure 2:
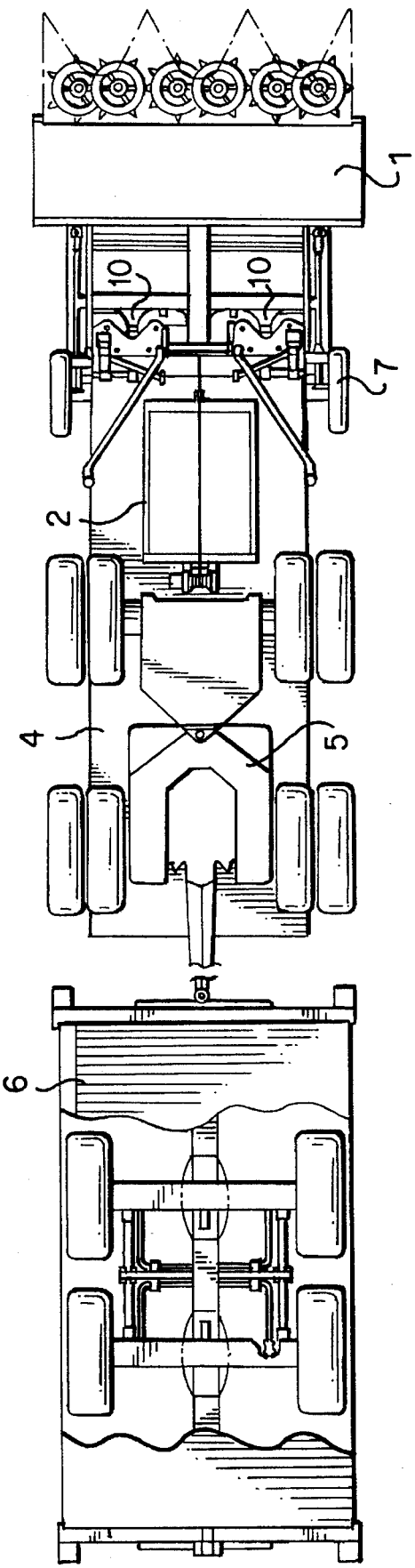
FIG. 2 General Top View.

Referring first to FIGS. 1, 2 of tho drawings, there is showing the main elements of the complete "Whole Cane Sugar Harvester that Tops, Cuts, Cleans and Loads": The topper 1 attached to base of the cabin 2, said topper 1 is moved up or down to adjust for proper height of topping to separate the biological material of the cane to be dewatered by the mill, and tho biological material (top), to be dewatered in the field, windrowing it on the side already harvested, to be air and solar dried. The cabin 2, rigidly supportal to the prime mover, contains all man operated controls for harvester and provides comfort to the operator, it is rigidly attached to prime mover 5. The front section 3, hinged to the body 4, and partly supported by the control wheels 7, it is formed by the crop dividers 8, the front roller 9, the base cutters 10, preferably three pairs of feed rollers 11, the grizzlies 12, and the rock trapdoor 13. The body 4, pivoted to the prime mover 5 has a large 2.7 Mt. inside width, it has two hydraulic cylinders 18 to obtain a two position hydraulic control: transit, contains preferably twelve pairs of the primary cleaning rollers 14 and preferably six pairs of secondary cleaning rollers 15. The leaves detached from the previous action, fall through the rubber rollers 14 and 15 onto the flat belt conveyor 17 moving down, and the collected leaves empty on the ground for air and solar drying through a window 17a cut across the whole width of the body 4. Said body 4 is hinged in the support 20, between the base of cabin 2 base and prime mover 5, which is preferably an articulated hydrostatic transmission diesel powered machine. Prime mover 5 functions to power all pumps, provide control, and deliver hydrostatic energy to its own motors and pistons and to the motor and piston of the topper 1, front section 3, body 4, and a special semitrailer 6; semitrailer 6 is designed as a high side dump type, that after filled with the clean canes received from the body 4, can empty its load to any other vehicle with equal or greater capacity.

The topic system:

The description of the invention relates to a topper 1 FIG. 1, with the following principal characteristics: high capacity, light weight, operated by a single hydraulic motor. When the topper, being attached to the harvester forward of the base cutters 10, cuts the tops of the sugar cane before its bas is cut, the severed tops, fall onto a parallel belt conveyor transversely oriented with respect to direction of harvester travel and positioned immediately behind the line of circular saws. The movement of the conveyor is reversible in direction with an electric remote control, to chose the proper direction necessary in order to convey the severed tops to the side of the field that has been harvested immediately before, enabling the harvester after finishing the field, to return cutting in the opposite direction, reversing the direction of the conveyor by the remote control, delivering the severed tops to the side of the field that has been harvested. This improved method saves time in harvesting and tear on the machines since they do not have to travel or harvest across the rows. The upward movement of the topper determines the height of the cutting, operating with an electric winch installed from the rear of the cabin, lifting with a wire cable the topper carrier.

Figure 3A:
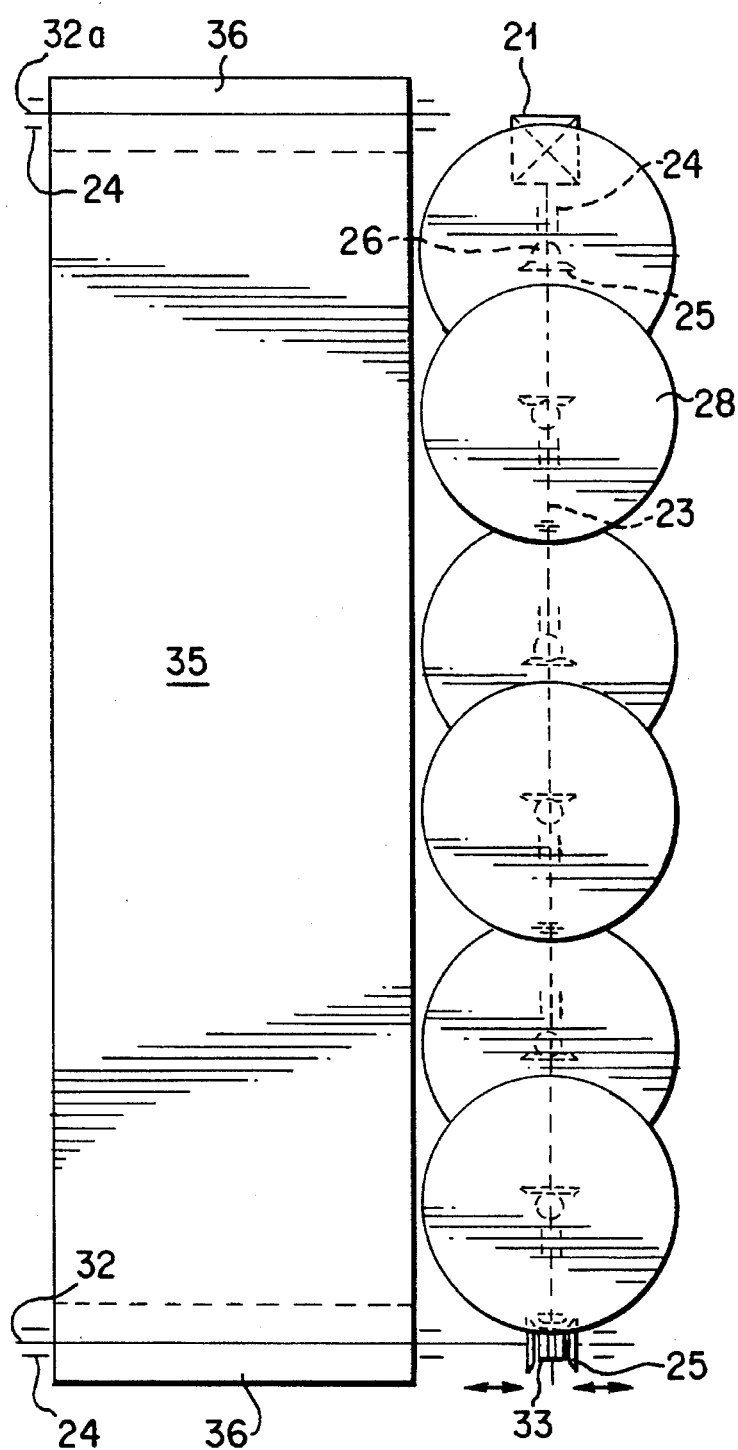
FIG. 3a and 3b Topper Conical Gear Transmission.
Figure 3B:
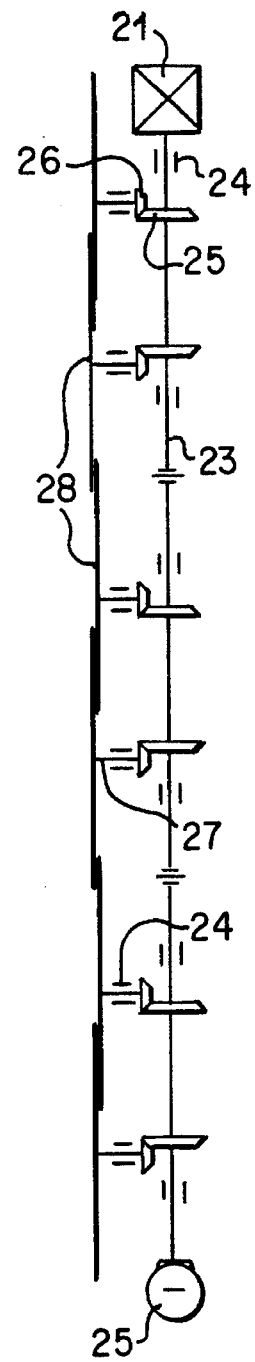
Figure 4B:
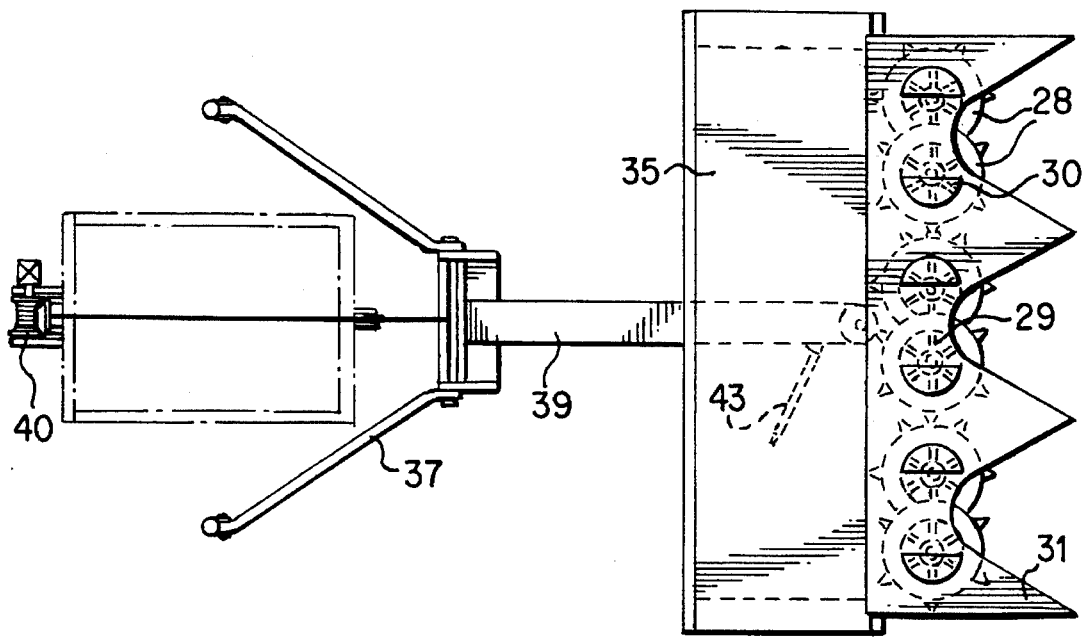
FIG. 4b Embodiment of Topper and its Carrier, top view.
Figure 4A:
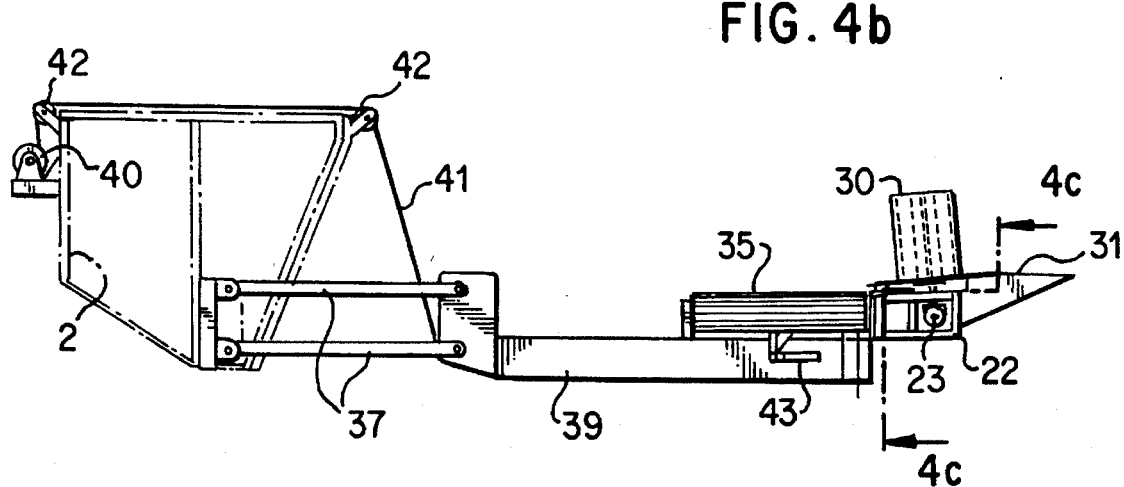
FIG. 4a Embodiment of Topper and its Carrier, side view.
Figure 4C:
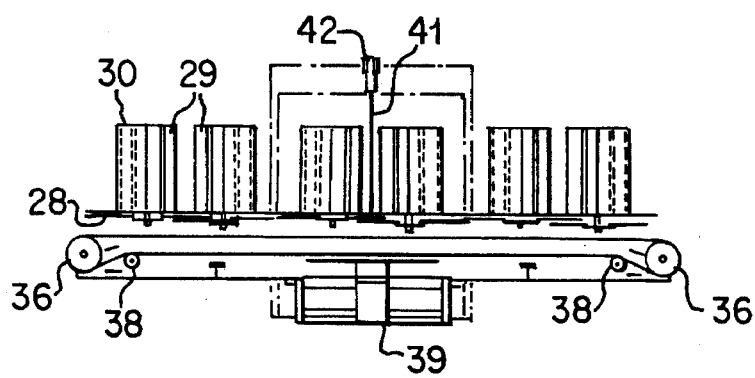
FIG. 4c Section A–A' of Topper and its Carrier.

The topper 1 FIGS. 3 and 4, consists of a single hydraulic motor 21 mounted to a housing 22, directly operating a horizontal longitudinal shaft 23, mounted with proper bearings 24, where a number of conical gears 25 are keyed; the odd numbered facing to the hydraulic motor 21 and the even numbered facing opposite direction; each of said conical gears 25 mesh with smaller conical gears 26 which are keyed to vertical shafts 27, immediately above, two bearings 24 mount the vertical shaft 27 to the housing 22, immediately above, a circular saw 28 is properly keyed to the vertical shaft 27, immediately above, a sleeved multiple rubber paddle 29 of smaller diameter than the saw 28 is keyed to the vertical shaft 27. Due to the previously mentioned arrangement, a line of preferably six horizontal counter rotating circular saws 28, with rubber paddles 29 on top, are built. Since the distance between mounting centers is less than the diameter of the circular saws 18, the odd numbered are mounted either, higher or lower than the even numbered, in order to clear their movement. A vertical half cylinder shield 30 is welded for each rubber paddle 29 to the horizontal shield 31, said vertical shield covers the full height of the rubber paddle 29 to shield their outward action, said horizontal shield 31, serves the purpose of directing the cane tops to the counter rotating circular saws 28 coveting them all but the teeth that cut inward. The longitudinal horizontal shaft 23 extends within the housing 22 to a small conical gear 26 that continuously mesh with two large conical gears 25 free to rotate over a horizontal transverse shaft 32 mounted to the housing 22 with two bearings 24, Between said large conical gears 25, a jaw clutch 33, is positioned keyed to the transverse shaft 32 but free to slide to engage either large conical gears 25; The sliding movement of said jaw clutch is operated with a three position electric solenoid 34 (not shown) in order to obtain left-neutral-right movement of a conveyor belt 35 that transports the cut tops to either side on the choice of the operator. The flat belt 35 is mounted with two flat belt pulleys 36, in turn mounted with two shafts, one being the transverse shaft 32 and the other the auxiliary transverse shaft 32a and bearings 24 to the housing 22, said flat belt 35 needs two adjustable flat belt tightener 38 between it and the housing 22.

To provide means to change the height of the topper 1 to cut the tops at the desired height, is accomplished by the action of two parallel arms 37 per side, pivoted from the cabin's support 20 to the topper carrier 39. An electric wire cable hoist 40 mounted in the rear of the cabin 2 pulls the wire cable 41 that is attached to the topper carrier 39 guided by pulleys 42. See FIG.4.

To provide means to turn the topper 90 degrees to reduce its apparent width for transit, the preferred embodiment mounts a hydraulic cylinder 43 between the topper carrier 39 and housing 22, and provide means for said housing 22 to hinge at the end of the topper carrier 39.

The width of topping cut is 4.0 Mt.; the length of the flat belt conveyor 35 is 4.3 Mt.; and the width of the flat belt 35 is 1.22 Mt.

The Front Section (Base Cutter and Cleaner Feeding System:

The description of the invention relates to the front section 3, that plays a very important roll, being the interface between the crop and the cleaning of the stalk. Illustrated in FIG. 5, section 3 is hinged to body 4, its movement accomplished by the action of two hydraulic pistons 49 one on each side, and it is partly supported by the control wheels 7. Front section 3 has three hydraulic positions: transport-down-free; down is to lower until the control wheels 7 touch ground, free is for operation. The front section 3 is formed by the crop dividers 8, the front roller 9, the base cutters 10, the control wheels 7, the preferably three pairs of feed rollers 11, the grizzlies 12 and the rock trap door 13.

Figure 6B:
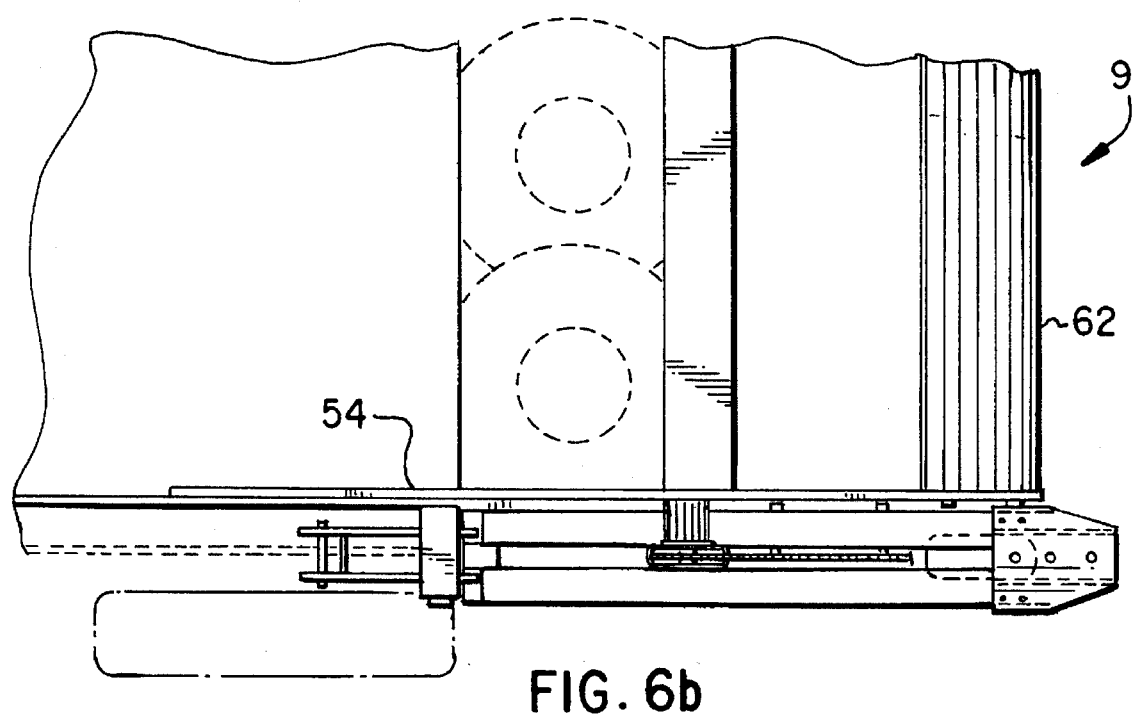
FIG. 6b Phantom Top View, Front Section, showing Crop Divider.
Figure 6A:
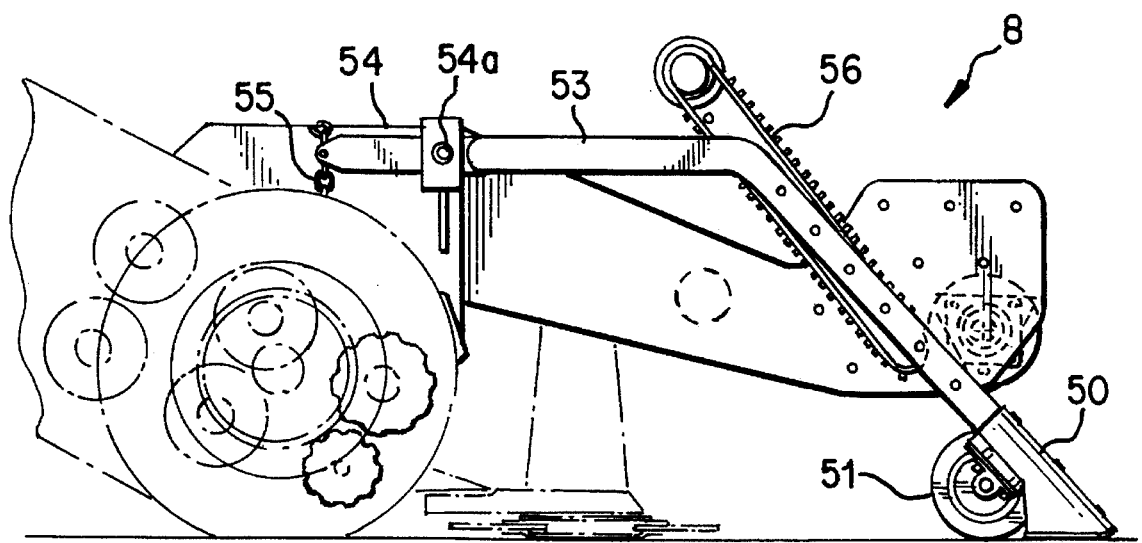
FIG. 6a Phantom Side View, Front Section, showing Crop Divider.
Figure 6C:
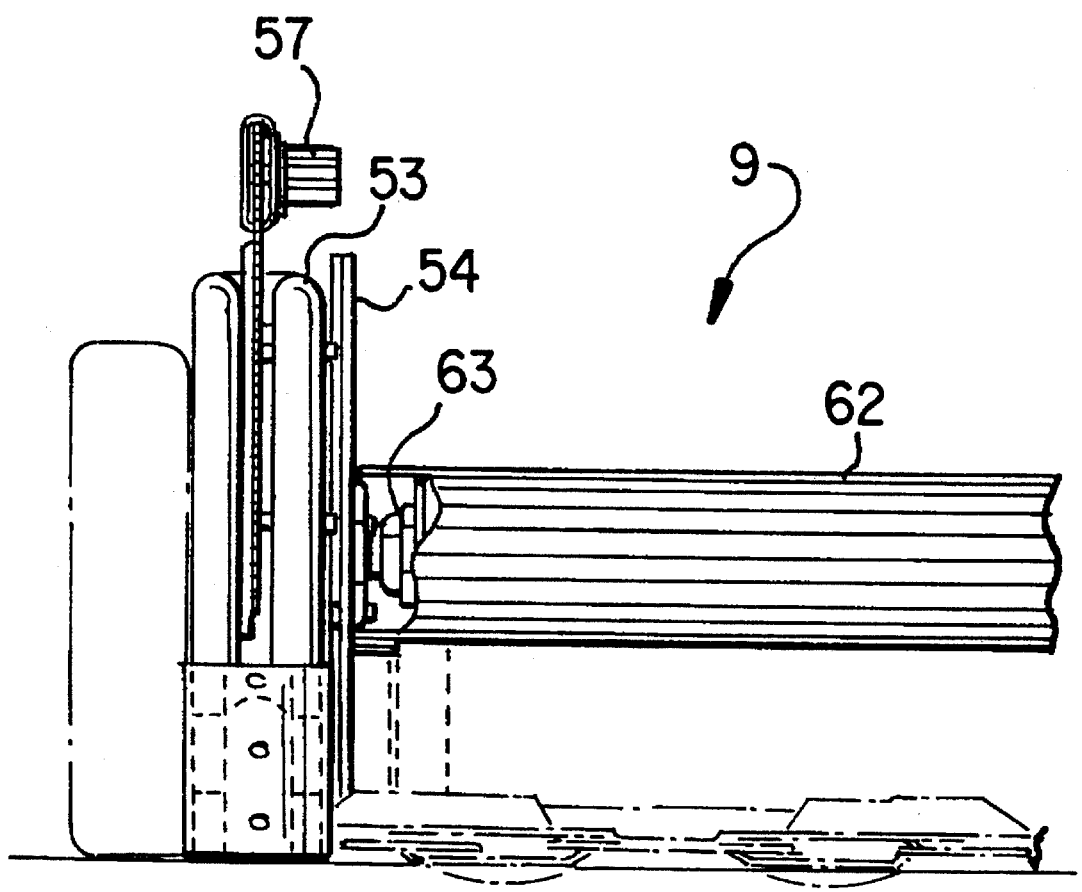
FIG. 6c Phantom Front View, Section, showing Crop Divider.
Figure 7A:
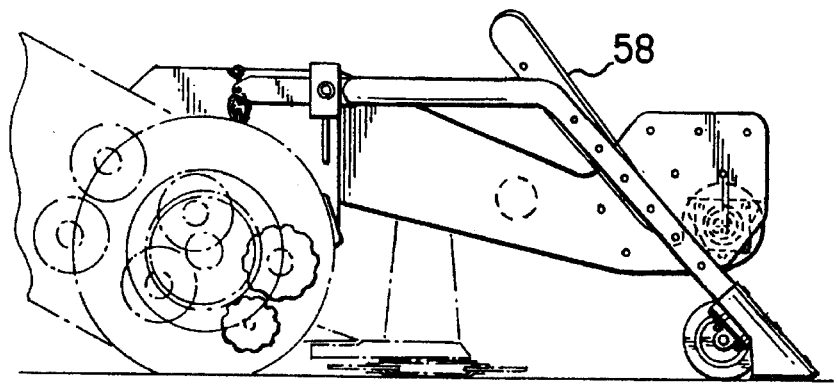
FIG. 7a Phantom Side View, Front Section, showing Straight Knife Option.
Figure 7B:
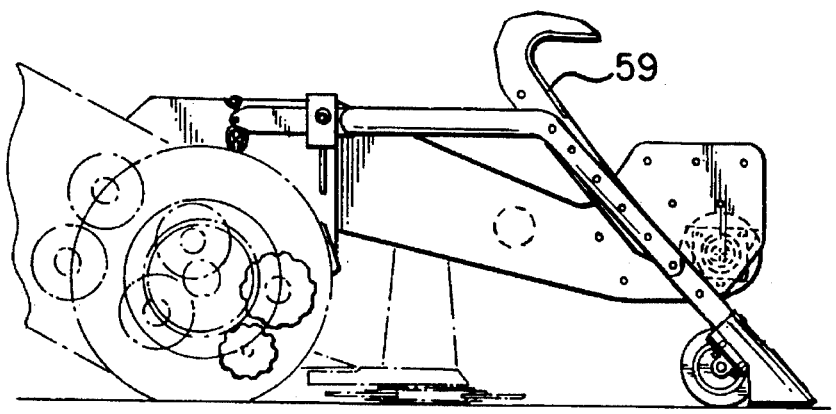
FIG. 7b Phantom Side View, Front Section, showing Curved Knife Option.
Figure 7C:
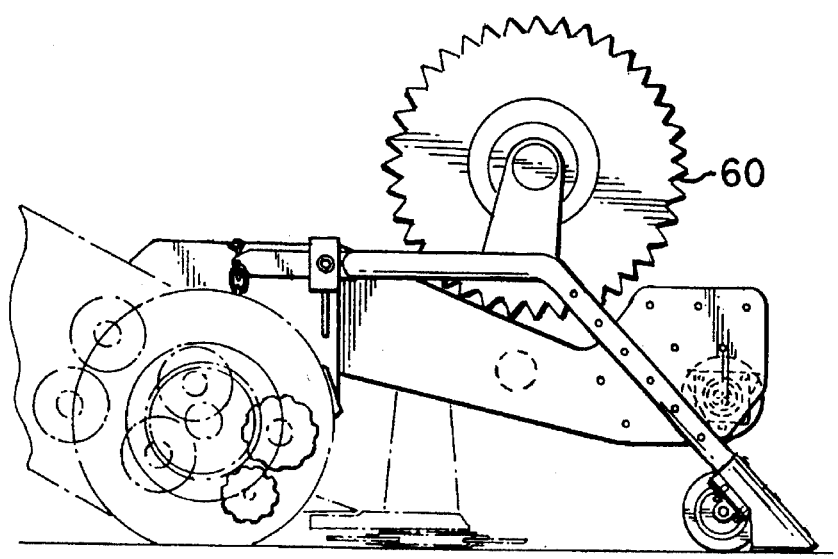
FIG. 7c Phantom Side View, Front Section, showing Circular Saw Option.

A crop divider 8 is illustrated in FIG. 6 and 7. One divider is needed on each side of the harvester, so that the harvester can cut either side. It serves to separate the crop from the part to be harvested. It consists of a shoe 50, an adjustable height wheel 51, both attached to a curved double tubing 53 hinged to the frame 54 by pivot 54a. A control chain 55 is used for adjustment. A chain saw blade 56 is mounted between the double tubing 53 and a hydraulic motor 57 drives the chain saw blade 56. The preferred chain saw blade 56, can be substituted by a straight knife 58, FIG. 7a, a curved knife 59 FIG. 7b, or a hydraulically operated circular saw 60, FIG. 7c. The different options are to cope with the different conditions of recumbent cane.

The Front Roller 9 FIGS. 6b and 6c, is a heavy wall pipe 62 mounted with bearings 63 to the frame 54. The canes are flexed forward by the movement of the harvester by means of the front roller 9, it also makes the cane lean against each other to form a double curve FIG. 5 in a way that the base of the cane will snap up when cut at the base, making it possible for the feed rollers 11 to feed the cane into the harvester. Service adjustment, vertical and horizontal is provided for different types of canes. Also depending of the type of cane the front roller 9, can be a freewheeling type or a power type roller, usually driven at a peripheral speed of 10% over the forward speed of the harvester.

Figure 8A:
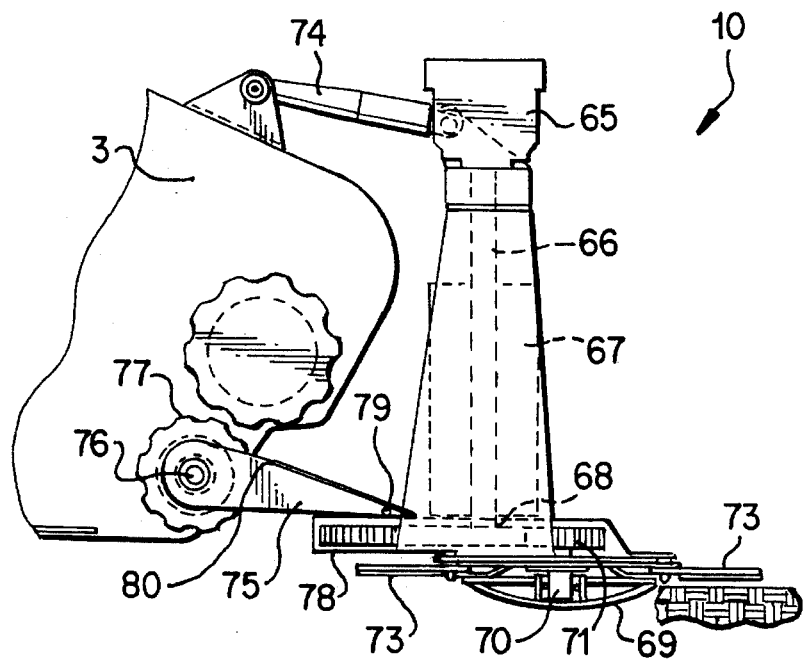
FIG. 8a Side View, Base Cutter.
Figure 8B:
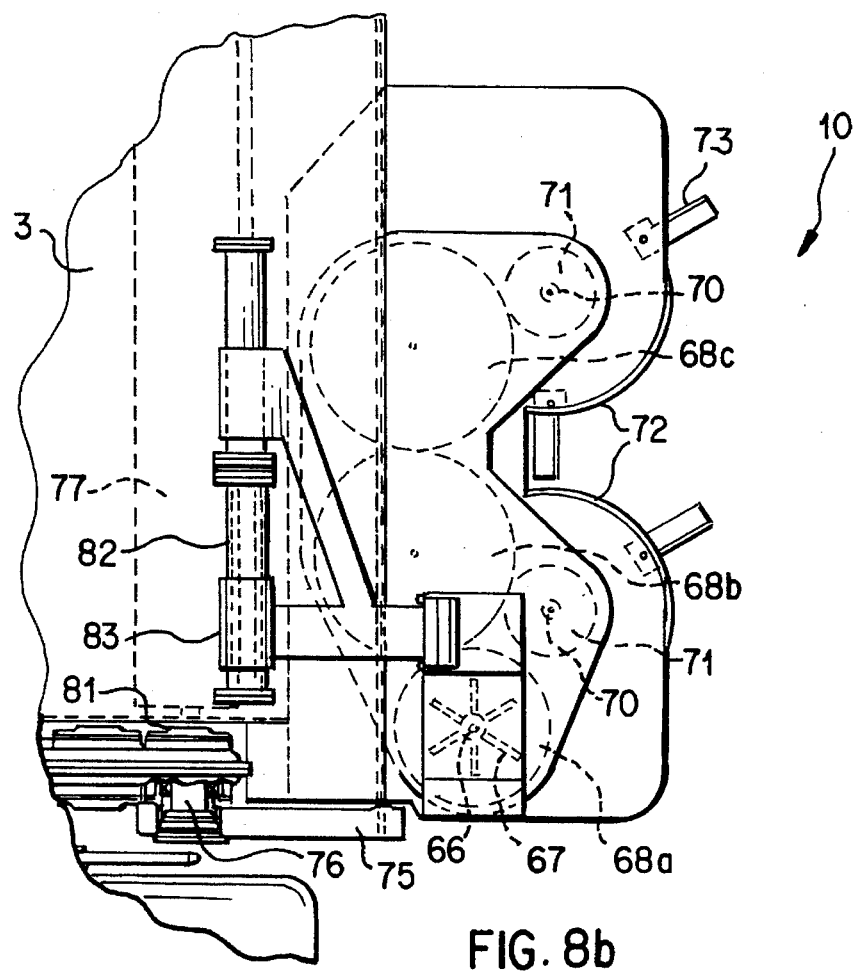

A base cutter 10, is illustrated in FIGS. 7,8. There is one set of double counter rotating cutters for each row. Each set is driven by one hydraulic motor 65 connected to a vertical shaft 66, which is provided with rubber paddles 67 along its length to help move the cut cane into the feed rollers 11. The vertical shaft 66 is connected to a set of gears 68 comprised of gear 68a, 68b, and 68c that synchronizes and drives the counter rotating cutters. The base cutters 10 are used to cut the cane as close as possible to the ground automatically move up or down with respect to the front section 3, following the shape of the ground, due to the action of two spherically dished followers 69, free to rotate at the lower end of their vertical shafts 70. Keyed in shaft 70 between follower 69 and gear 71, the knife carrier 72 holds three knifes 73. The upward movement is controlled by a four bar linkage, wherein the upper link 74 is a wide base triangle, and the lower link 75 is a steel plate extending the whole width-of the machine hinged to the shaft 76 of the first bottom feed roller 77. The gear box 78 mounting plate hinge 79 and the front hinge of lower link 75 have 0.025 Mt. steps with the object of moving sideways at the same time both base Cutters 10 to have 0.05 Mt. increments between rows FIG. 8. On top of lower link 75 steel plate is a wear plate 80. The weight of the base cutter 10 assembly is 80% compensated by an adjustable torsion bar 81 inside the hollow pin 82 of the upper hinge 83. The crop is cut and always delivered to the first bottom feed roller at the proper height.

Figure 9A:
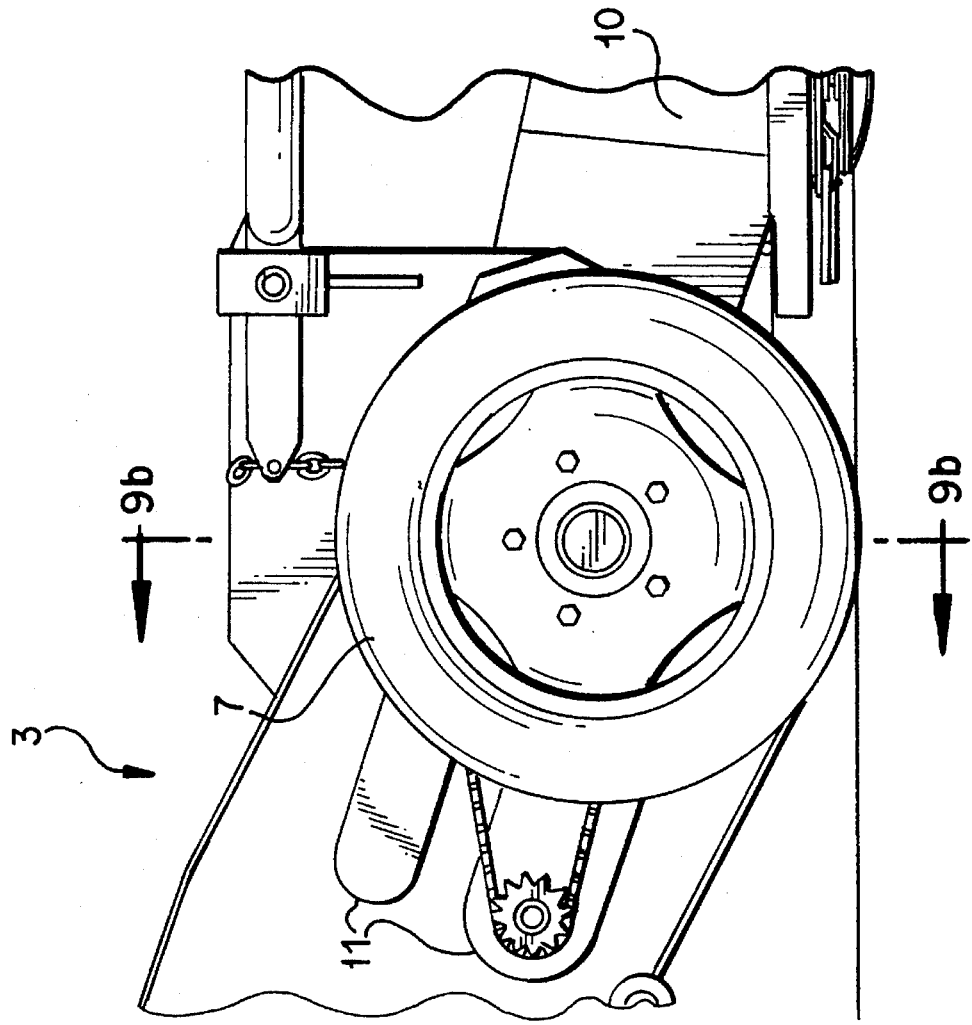
FIG. 9 Side and Front Views, Control Wheels Embodiment.
Figure 9B:
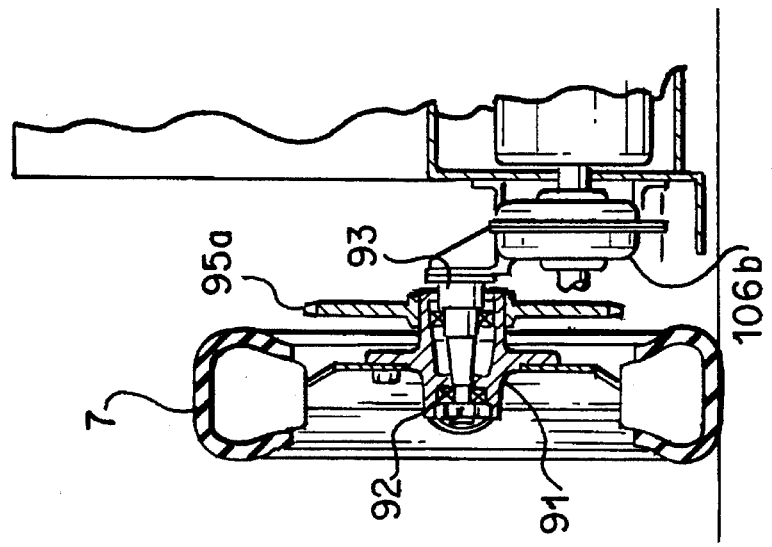
Figure 14A:
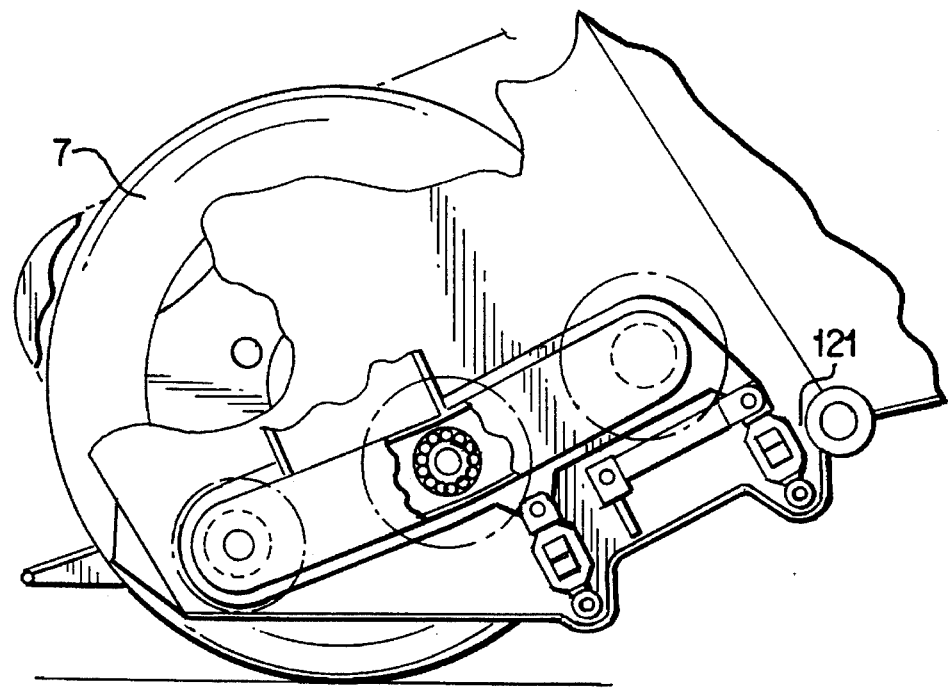
FIG. 14a Left Side View, Bottom Feed Rollers Drive.
Figure 14B:
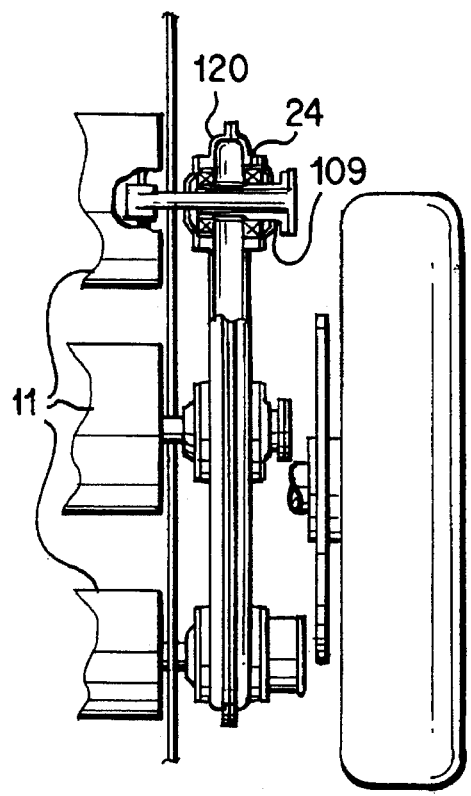
FIG. 14b Left Top View, Bottom Feed Rollers Drive.
Figure 14C:
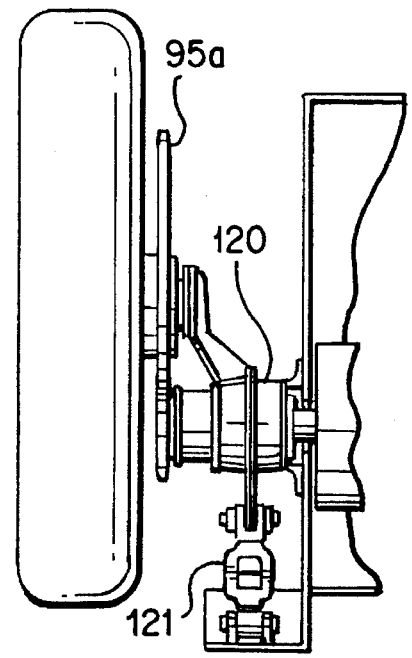
FIG. 14c Left Front View, Bottom Feed Rollers Drive.
Figure 15A:
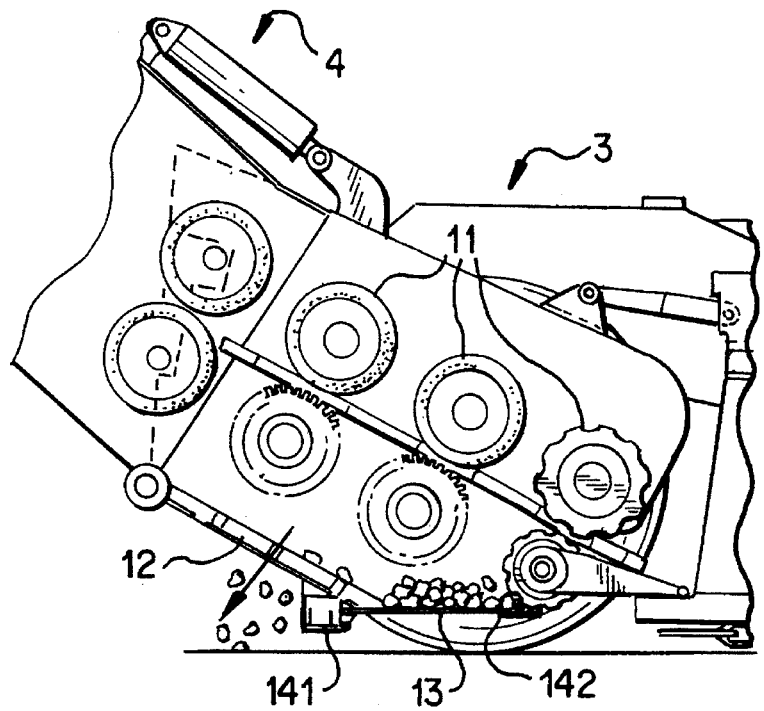
FIG. 15a Side Crossection of Grizzlies and Rock Trap Door in Operation.
Figure 15B:
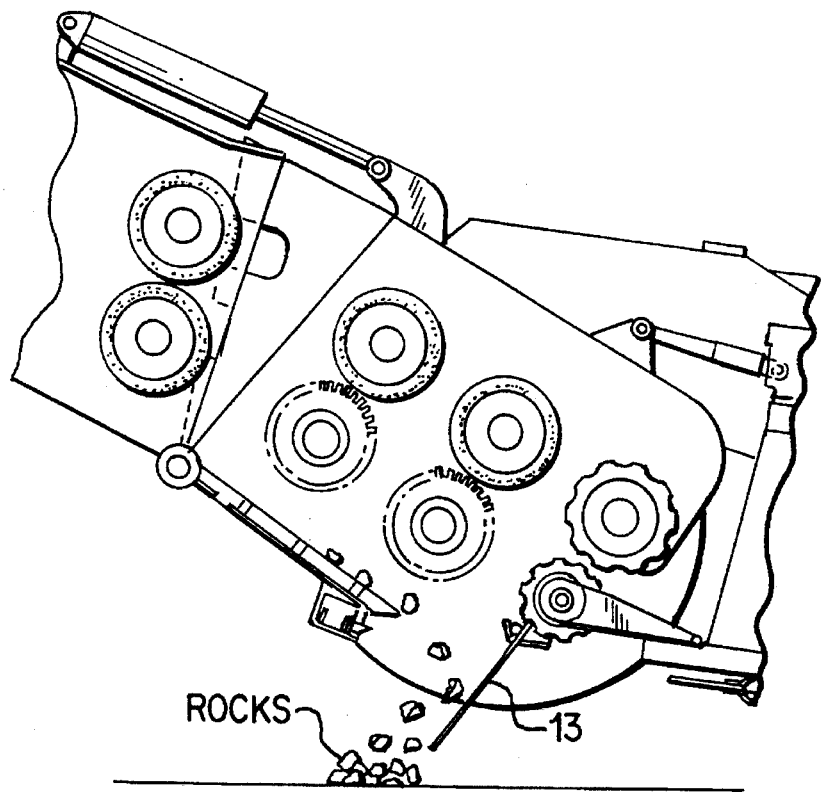
FIG. 15b Side Crossection of Grizzlies and Rock Trap Door Discharging.

Control wheels 7 are shown in FIG. 9. One control wheel 7 is mounted on each side in the lower part of the front section 3 to provide additional support. The control wheels 7 also provides a height control by following the surface of the ground, traveling close to the base cutters 10 without interference by the crop. The tire and rim 7 are mounted to a hub 91 and with bearings 92 to a stub shaft 93, which is mounted to the gear box 106 in the right side of the machine, and to housing 120 in the left side of the machine (see FIG. 14), the stub shaft 93 is mounted on hub 91 as is a sprocket 95a to drive the feed rollers 11.

Figure 10:
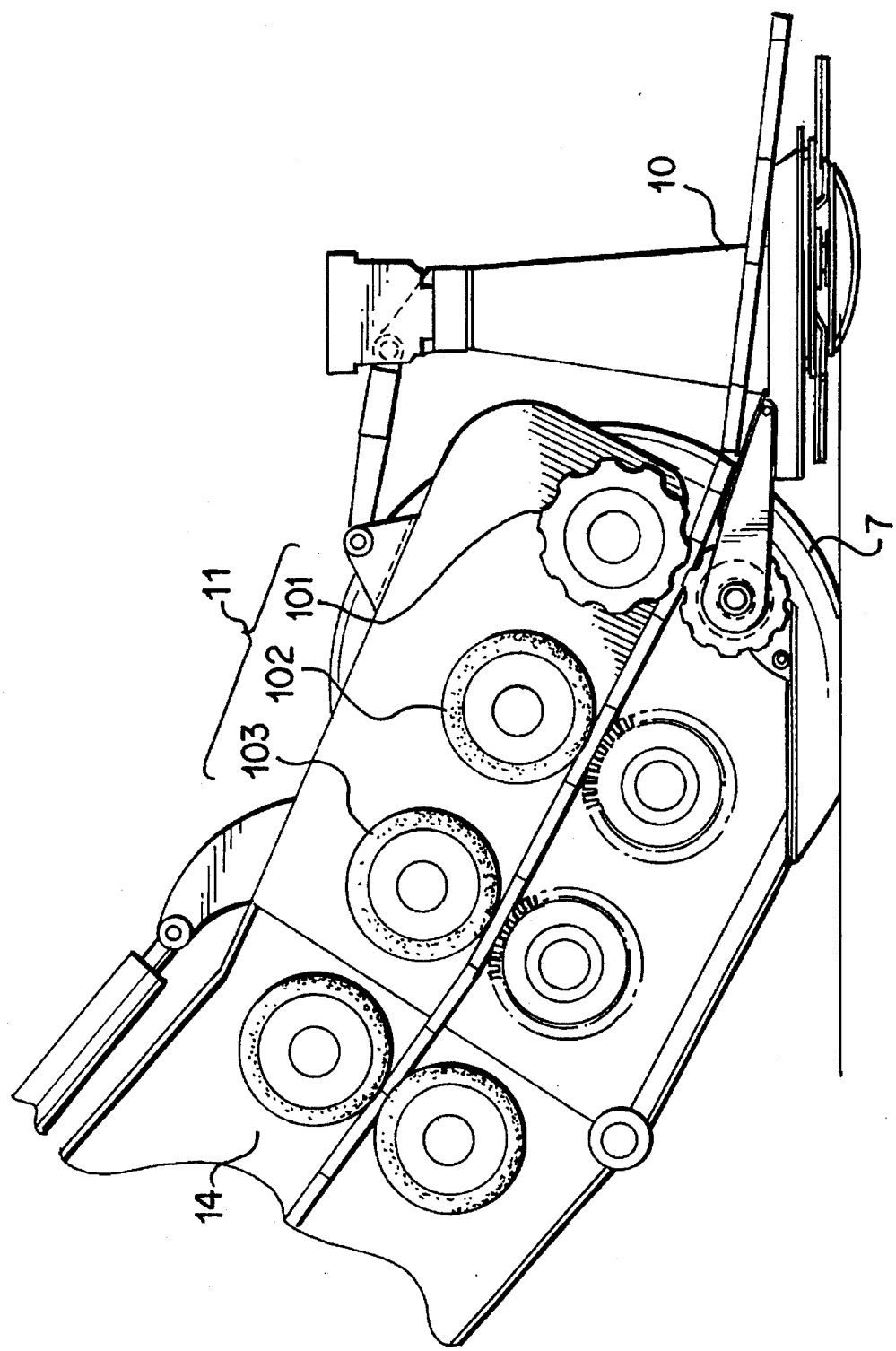
FIG. 10 Cross Section through Feed Rollers.

The feed rollers 11 FIG. 10, are placed across the full width of the mouth of the harvester, and all are driven by the control wheels 7. The first pair of feed rollers 101 is driven with a peripheral speed of 10% above the traveling velocity of the harvester, both being built with firm laminated rubber, the small being at the bottom. The second pair of feed rollers 102 is driven at 24% above the traveling velocity of the harvester, the bottom roller is a paddle-brush type for greater flexibility for handling rocks. The third pair of feed rollers 103 is driven at 39% over the traveling velocity of the harvester; the bottom roller is also a paddle-brush type for greater flexibility for handling rocks. The feed rollers positively feed the cane from the base cutters 10 to the primary cleaning rollers 14.

Figure 11A:
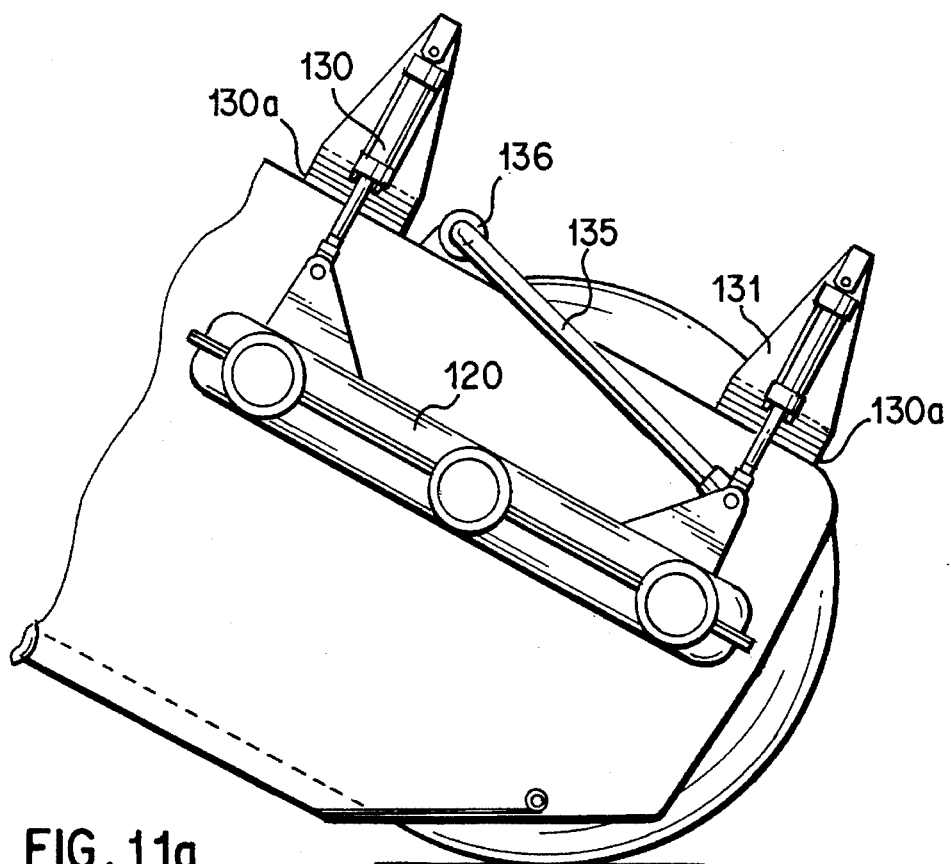
FIG. 11a Right Side View, Upper Feed Rollers Drive.
Figure 11B:
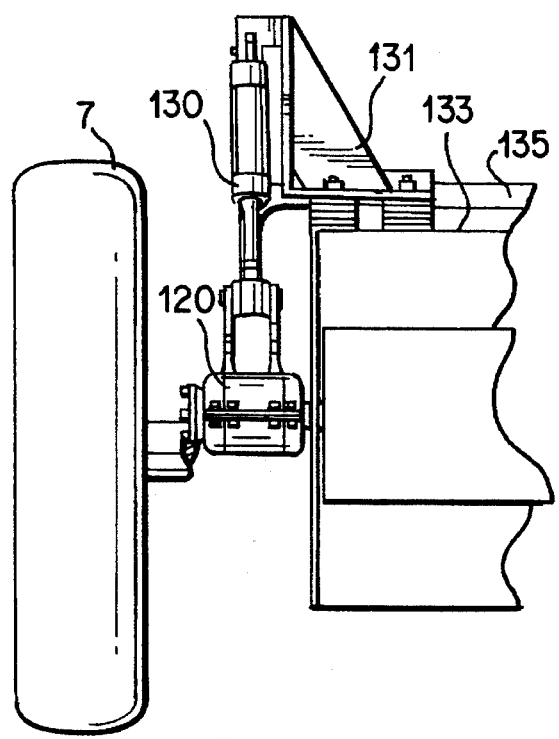
FIG. 11b Right Top View, Upper Feed Rollers Drive.
Figure 11C:
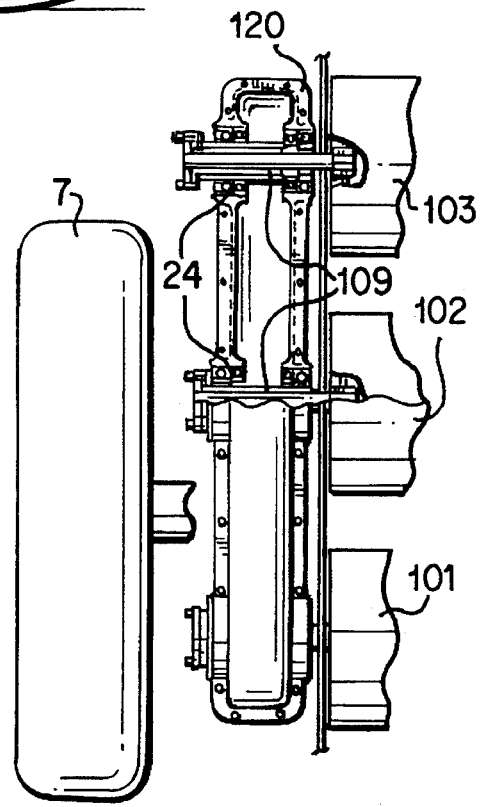
FIG. 11c Right Front View, Upper Feed Rollers Drive.
Figure 12A:
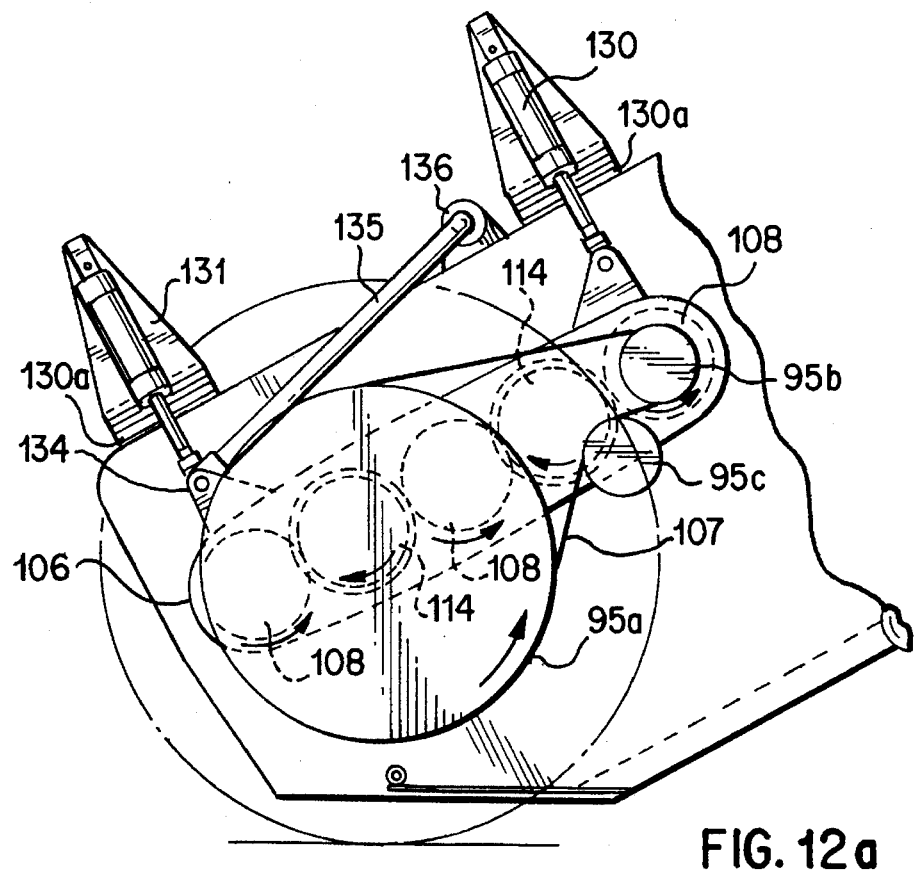
FIG. 12a Left Cross Section, Upper Feed Rollers Drive.
Figure 12B:
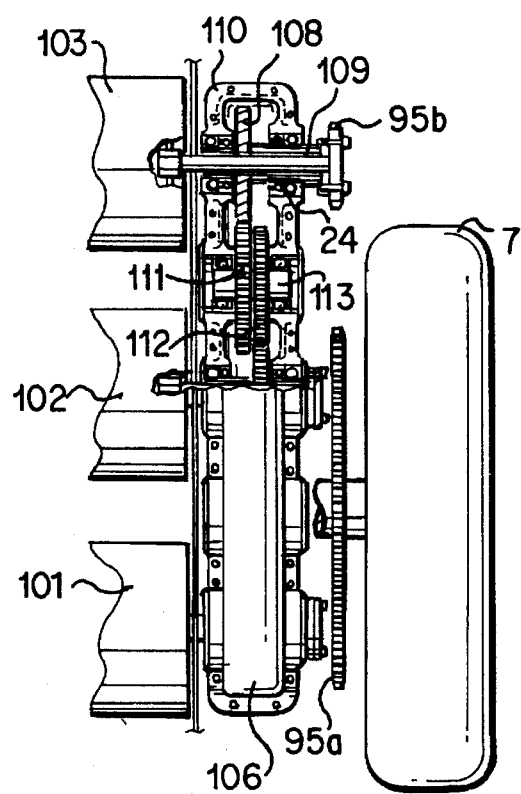
FIG. 12b Left Top View, Upper Feed Rollers Drive.
Figure 12C:
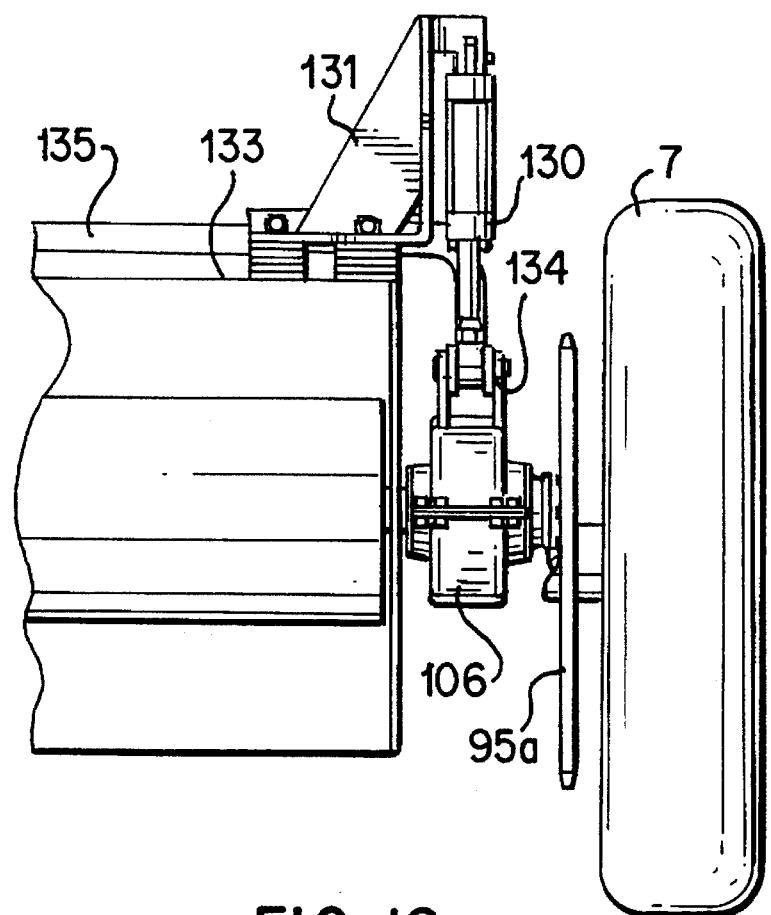
FIG. 12c Left Front View, Upper Feed Rollers Drive.
Figure 12D:
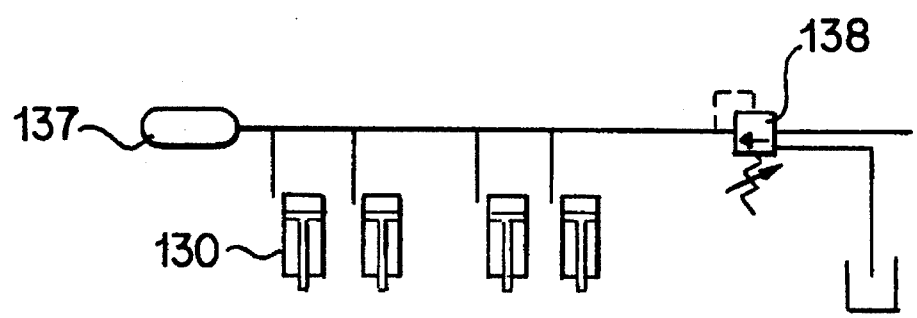
FIG. 12d Scheme of Hydraulic Circuit for Upper Rollers

The driving mechanism of said feed rollers 11 will now be described. The purpose of the drive mechanism is to provide a progressively increasing acceleration from one pair of feed rollers to the next. In the left side of the machine as shown FIG. 12, a gear box 106 is located to drive the upper rollers. At the other side of the feed rollers 11, in order to mount them, a simplified housing 120 with same overall dimensions of gear box 106, with only bearings 24 and hollow shafts 109 is constructed FIG. 11. The left control wheel 7 drives a sprocket 95a FIG. 12 and through open chain 107 drives a sprocket 95b and a self spring adjusted idler sprocket 95c. Said sprocket 95b is mounted to hollow shaft 109 of the third roller in gear box 106. Each gear box contains three equal gears 108 mounted in hollow shafts 109 that drive each feed roller. Said hollow shaft is mounted through bearings 24 to housing 110. Between each gear 108, there are equal double gear idlers 114, where the ratio of the number of teeth between large gear 111 and small gear of the double gear 114 is such as to provide the aforementioned increase in rotational speed of successive feed roller pairs. For example, as one of ordinary skill in the art would understand, the ratio of the number N of gear teeth for the respective larger and smaller gears 111, 112 interconnecting the gear 108 driving feed roller 101 and the gear 108 driving feed roller 102 would be equal to the inverse of the respective shaft speeds, which in the case of the top rollers, would be proportional to the linear peripheral speeds of the equal sized feed rollers, namely:

$$R = \frac{N \text{ large gear}}{N \text{ small gear}}$$
$$= \frac{\text{peripheral speed of } 102}{\text{peripheral speed of } 101} = \frac{1.24 V_H}{1.10 V_H}$$
$$\cong \frac{9n}{8n}$$

where $V_H$ is the forward speed of the harvester and n is an integer. In a similar fashion, the ratio for double gear 114 between feed rollers 102 and 103 would be $$R = \frac{1.39 V_H}{1.24 V_H} \cong \frac{9n}{8n} .$$

Said double gear idlers 114 are mounted with bearings 24 and shafts 113 to housing 110.

The upper rollers have an adjustable downward load FIG. 12. Properly adjusted, the upper rollers do not touch the bottom rollers although they can move upward according to the quantity of cane passing per unit time. The adjustment mechanism consists of four hydraulic cylinders 130, two pivoted to housing 110 and two pivoted to housing 120, at their opposite ends, the four are pivoted at an extension 131 of upper frame 133. From the same two front pivot points on the housings 110 and 120 with two yokes 134 at the ends of a anti roller torsion bar 135, is mounted with rubber bushings 136 to the upper frame. The adjustment for wear is accomplished by changing shims 130a from top to bottom of the extension of upper frame 131. The means to adjust the downward load is by connecting the four hydraulic cylinders 130 to a common hydraulic accumulator 137 and connecting in parallel an adjustable pressure valve 138 and to a hydraulic main. The bottom feed rollers are driven by open chain 107, and in order to change the direction of rotation, said open chain 107, in the right side, drives a sprocket 113a attached to shaft 113 of gear 114 after the third roller. In order to compensate for the difference in diameter of the first bottom roller, the diameter of the gear 108 attached to its shaft is smaller and the idler 115 of proportionally larger diameter to maintain the same center distance. In the other side of the feed rollers 11 FIG. 14, in order to mount them, a simplified housing 120 with same overall dimensions as 110, with only bearings 24 and hollow shafts 109 are constructed.

Figure 13A:
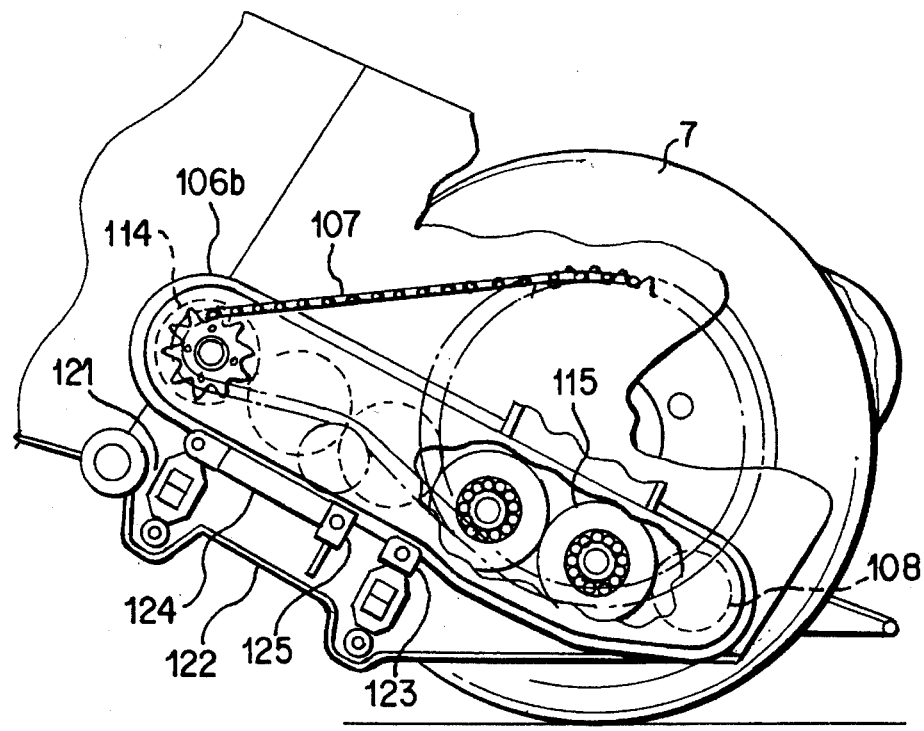
FIG. 13a Right Side View, Bottom Feed Rollers Drive.
Figure 13B:
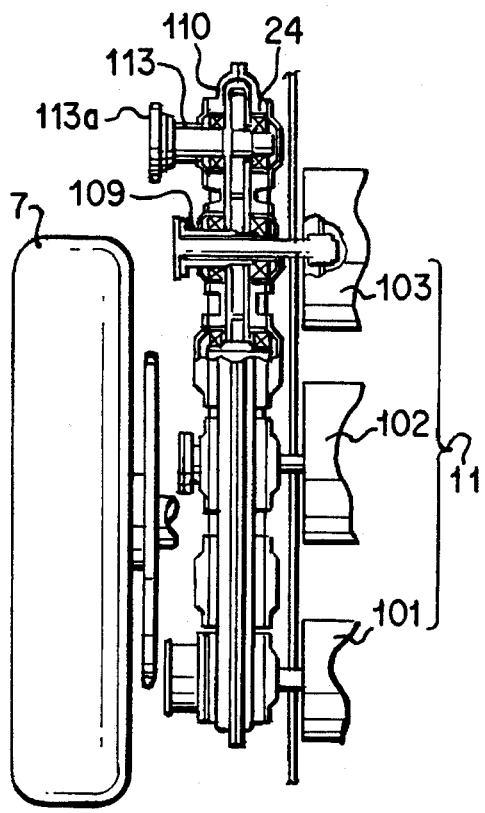
FIG. 13b Right Top View, Bottom Feed Rollers Drive.
Figure 13C:
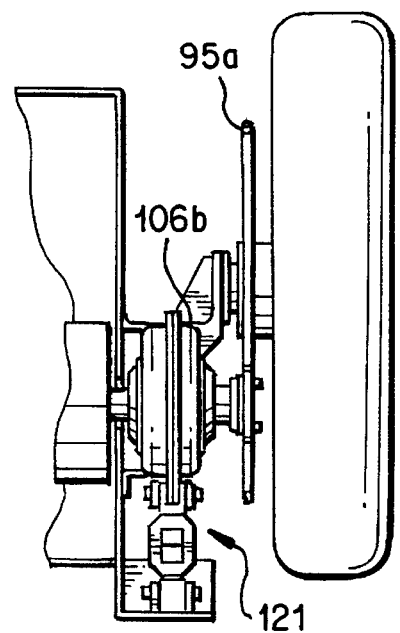
FIG. 13c Right Front View, Bottom Feed Rollers Drive.

The three bottom feed rollers 11 FIG. 13 have a service adjustment for roller wear. It consists of four adjustable right and left hand thread links 121, two pivoted to housing 110 and two pivoted to housing 120. At their opposite ends, the four are pivoted at the bottom of the side frames 122. From said four pivot points on the housings 110 and 120, four yokes 123 of the four tension bars 124, which at their opposite ends have other four yokes 125, are pivoted at 90 degrees rearward to a support welded to the side frame 122. By moving the adjustable links, the housings 110 and 120 can be moved upwards to compensate for a diminishing diameter of the rollers due to wear.

Below the feed rollers 11, HG. 15 and across all the width of the machine, a set of grizzly bars 12 adjusted for a separation of 0.05 Mt., retain all materials over that dimension, letting through materials under it. Below and towards the front, the rock trapdoor 13, is hinged to open toward the rear. The operator when he wants to dispose of the rocks, raises the body 4, and lowers further the front section 3, to collect all the rocks further to the front. He then trips the electric solenoid 141 to open the trapdoor 13, which will open due to the weight of the rocks and upon falling out, the trapdoor 13 will close by itself by means of the torsion bar 142

Figure 16:
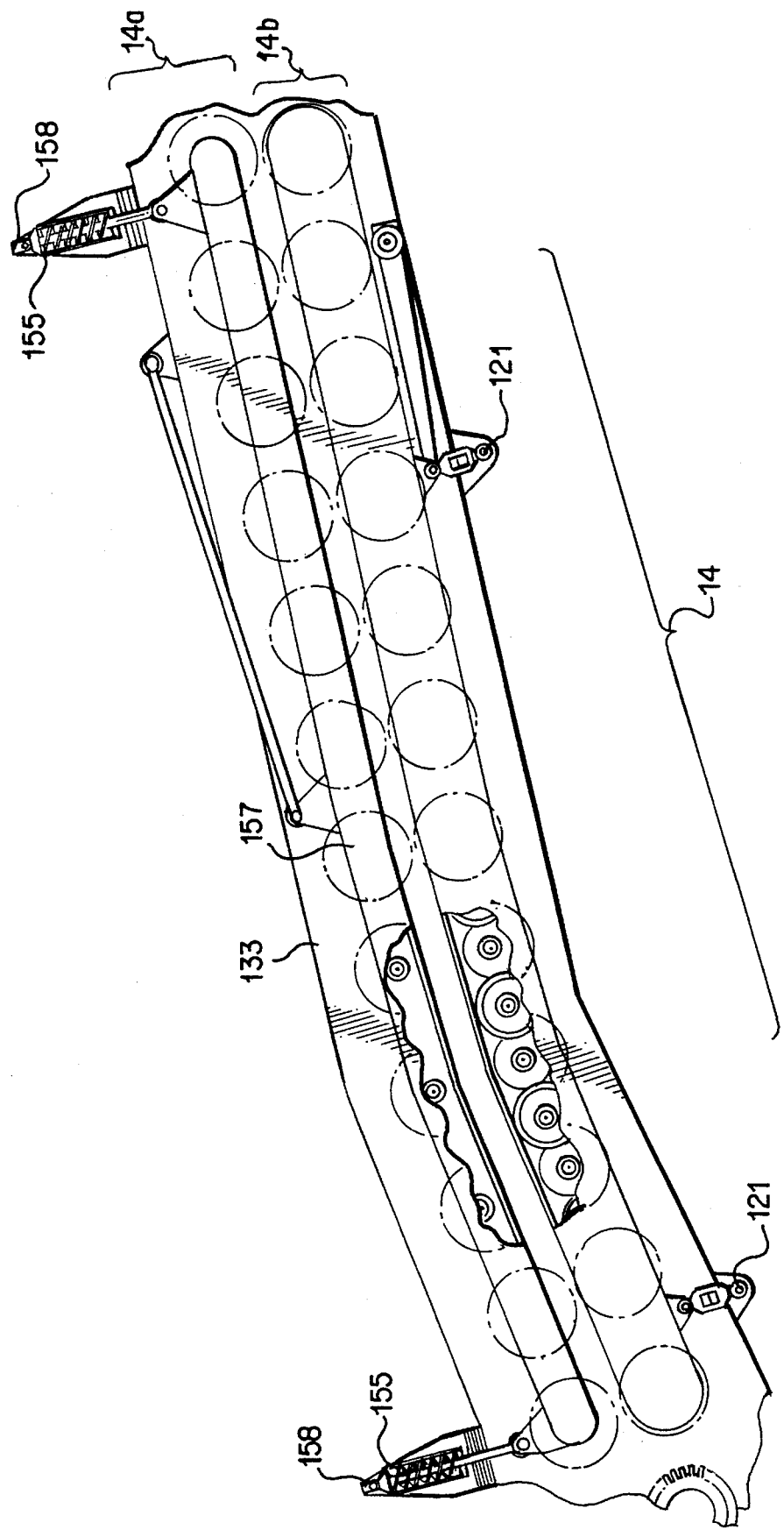
FIG. 16 Right Side View of Primary Cleaning Rollers.
Figure 17:
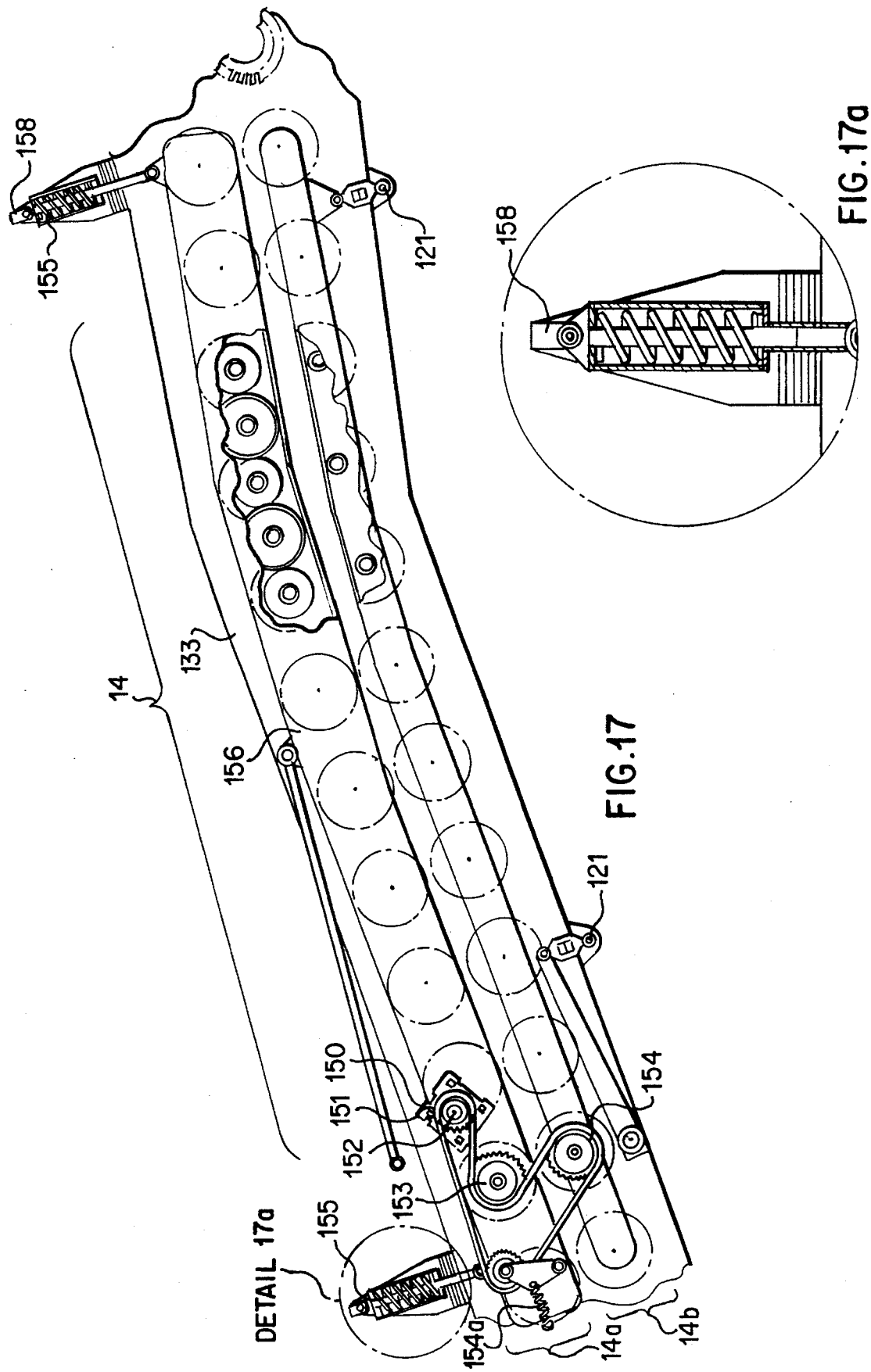
FIG. 17 Left Side View of Primary Cleaning Rollers.

The cleaning system:

The description of the invention now is directed to the Whole Stalk Green Sugar Cane Cleaning System aspect. The cleaning method objective of the present invention is to increase the quality of the whole cane and biomass to be free from loose soil and adhering mud, that could impair its milling, processing and utilization. A further objective of the present invention is to provide a high throughput, from 100 to 150 MTon./Hr., with no injury to the cane in order to preserve it from rapid bio-deterioration. The primary cleaning rollers 14 FIG. 16 that are comprised preferably of twelve pair of rubber rollers, begins in the body 4. Below and above the cane, a series of paired special rubber rollers 14, come in contact with the cane, each pair with the same counter rotating peripheral speed, but increasing its linear speed from one pair to the next pair, causing said cane to spread and advance. As the cane increases velocity due to the combined action of upper 14a and bottom rubber rollers 14b, the cane is conveyed in tension at the avenge speed of all the rollers in contact with the cane, the slip is greater at the ends of the stalk, hence the work of friction is greater at the ends of the cane. This effect, exclusive to this invention causes to detach the green leaves at the top and the attached mud on the lower end of the stalk.

The driving mechanism of the pair of primary cleaning rollers 14 is the same as for the upper feed rollers 11, with the exception that the primary cleaning rollers, both top and bottom are driven by a single hydraulic motor 150 with one sprocket 151 in its shaft 152 with one open chain driving two other sprockets, 153 and 154, one mounted to the next to the last upper roller shaft, the other mounted on the next to the last bottom roller shaft, and the chain tensioned by spring loaded chain idler 154a. The other exception is that when an angle is necessary in order to change the direction of the rollers, one or two of the neighboring idlers are made larger in the outer roller in order to keep the same center to center distance between each pair of rollers.

The bottom robber rollers 14b, have a service adjustment 121 for roller wear similar to the one used in the feed rollers 11.

The upper rubber rollers 14a HG. 16 and HG. 17 have an adjustable downward load. When properly adjusted, the upper rollers do not much the bottom rollers although they can move upward according to the quantity of cane per unit time. Adjustment is accomplished through four steel springs 155, two pivoted to housing 156 and two pivoted to housing 157, at their opposite ends, the four are pivoted to an adjustable opposite hand central support 158, which in turn is mounted to the upper frame 133.

The secondary cleaning rollers 15 HG. 18 and HG. 19 of the cleaning section is comprised preferably of six pairs of rubber rollers 15. Since by this time most of the leaves have been detached, a second type of action takes place in this section: the rollers 15 keep a constant avenge linear speed, but with different speeds between top rollers 15a and bottom rollers 15b. This speed ratio can be adjusted by changing the speed of the hydraulic motors 160 and 161, the former that drives the top rollers 15a and the latter the bottom rollers 15b. The adjustment, in order to save energy, is to have the smallest difference for consistent good cleaning, the choice can be: from pure conveying to intense erosion along the entire length of the cane. In order to use the proper velocity of the stalk to load the side dump semitrailer 6 hitched to the rear of the prime mover 5, the peripheral speed of this last group of rollers, can be varied by the operator by changing the speed of both hydraulic motors 160 and 161 together up or down.

Figure 18:
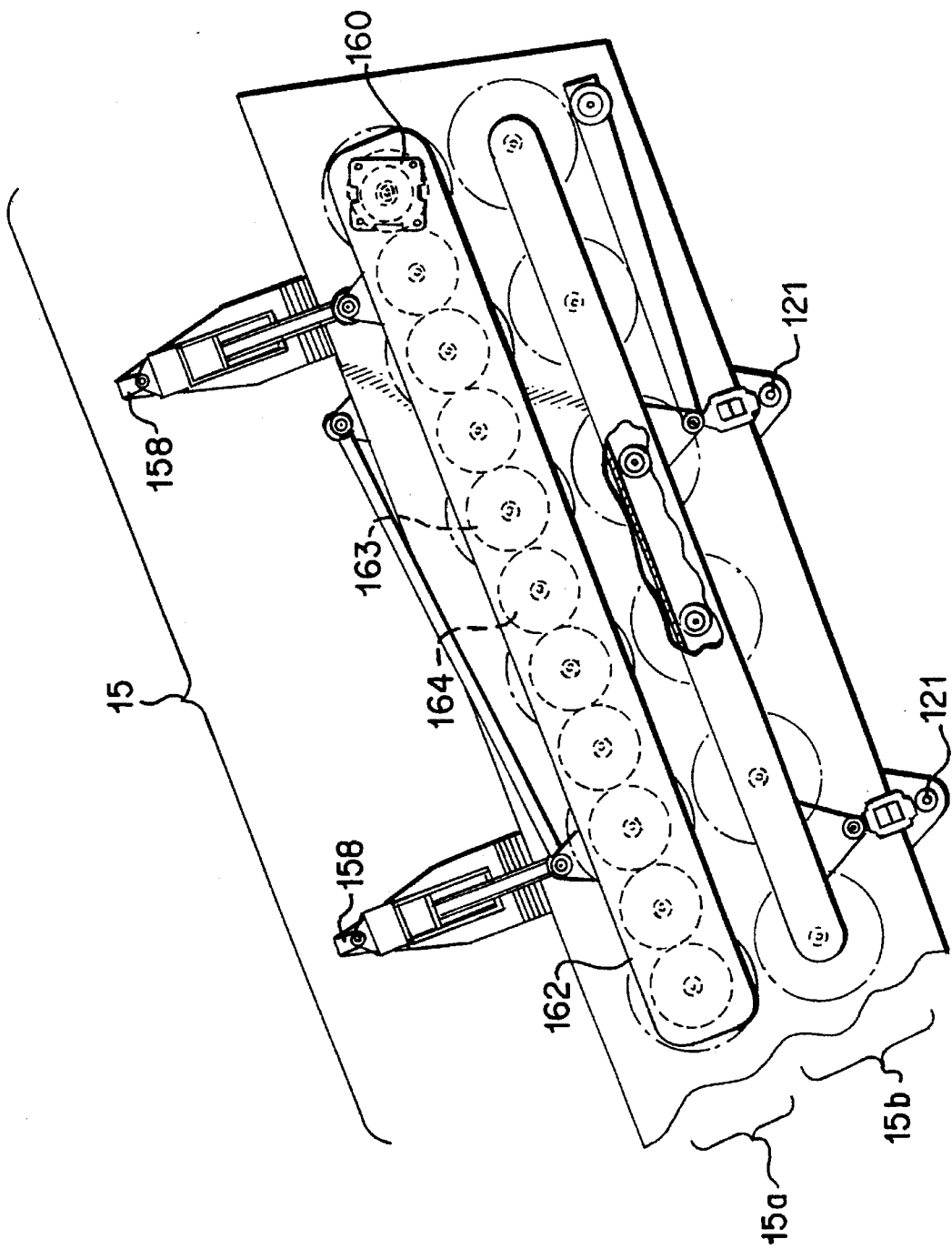
FIG. 18 Left Side View of Secondary Cleaning Rollers.
Figure 20A:
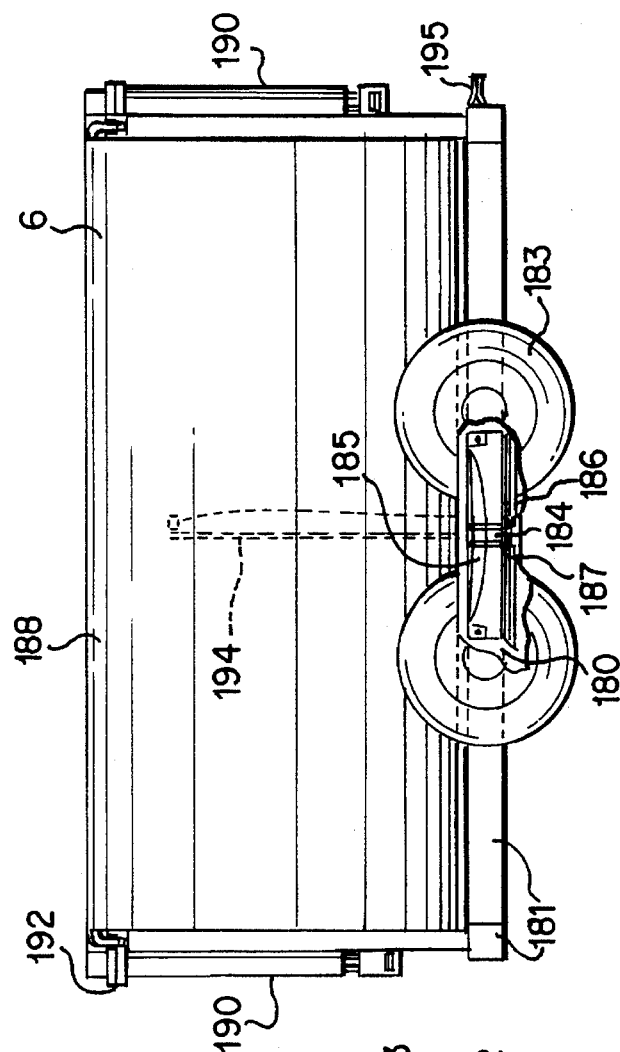
FIG. 20a Side View of Special Semitrailer.
Figure 20B:
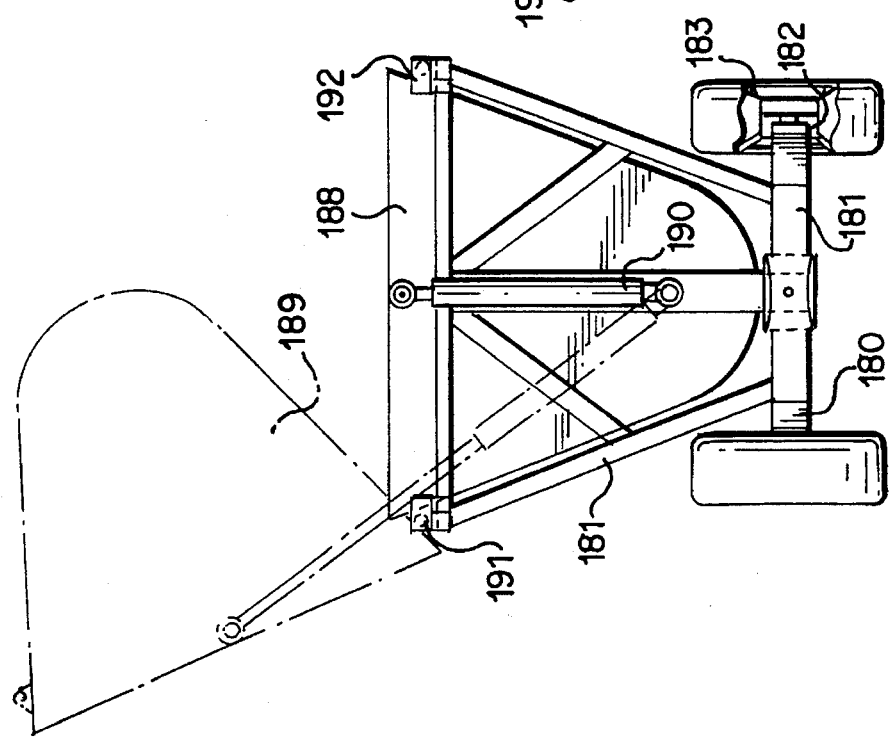
Figure 20C:
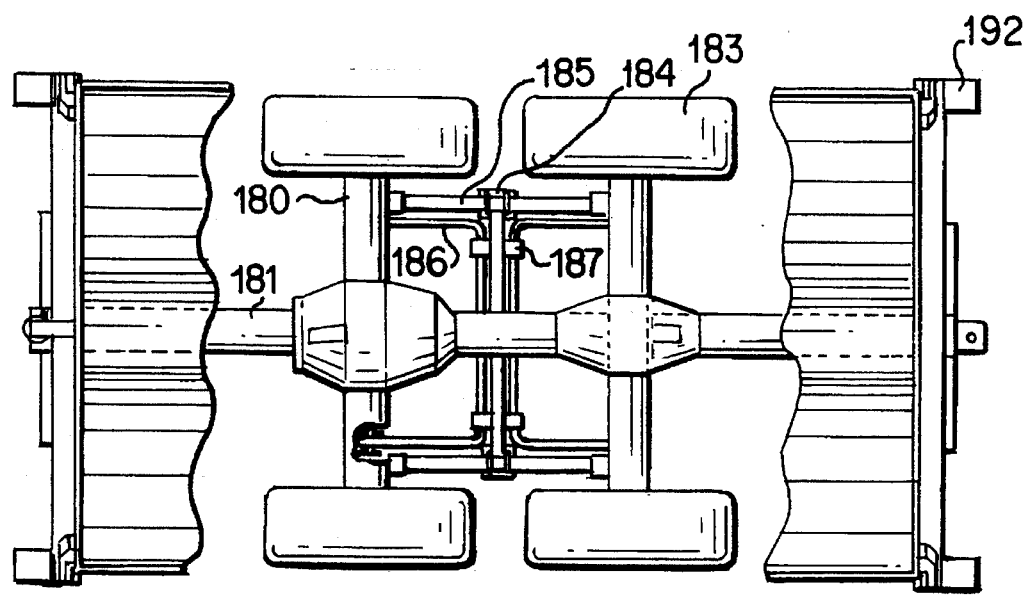
FIG. 20c Front Phantom View of Special Semitrailer.
Figure 20D:
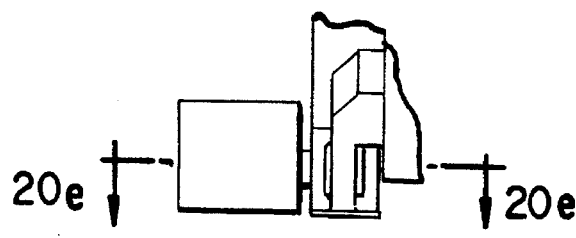
Figure 20E:
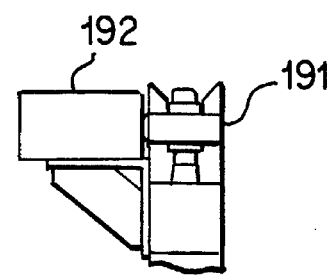
FIG. 20e Partial schematic view taken at line 20e–20e in FIG. 20d

The driving mechanism of said secondary cleaning rollers 15 FIG. 18 will now be described: The purpose of the drive is to provide a constant peripheral speed of all the secondary cleaning rollers 15a and a constant speed for all rollers 15b. It consists of two similar gear boxes 162, one to drive the upper robber rollers 15a and the other, to drive the bottom rubber rollers 15b, each of said gear boxes 162 being is driven by a respective one of the hydraulic motors 160 and 161. Each gear box 162 contain two gears per driven roller, one gear 163 to drive the rubber roller 15 and the other gear 164 to act as an idler between roller gears 163. All the gears involved can have the same number of teeth, or all gears 163 equal all gears 164 equal, either smaller or larger than 163, providing that their diametral pitch is adequate for the appropriate center to center distance. Said gears are mounted with bearings 24 and shafts 113 of idler 164 and bearings 24 and hollow shaft 109 for gear 163.

In the opposite end of the secondary cleaning rollers, to be able to mount them, a simplified housing 165 with same overall dimensions as gear boxes 162 with only bearings 24 and hollow shafts 109, is constructed. See FIG. 19.

When the direction of the rollers 15 have to be changed at an angle, one or two of the neighboring idlers are made larger in order to keep the same center to center distance between pair of rollers.

The bottom rubber rollers 15b, have a service adjustment for roller wear similar to the one used by the feed rollers 11.

The upper rubber rollers 15a, bear downward by their own weight. Properly adjusted, the upper rubber rollers 15a do not touch the bottom rollers 15b, although they can move upward according to the cane load.

During all the cleaning period, all leaves detached from the stalk fall through the rubber rollers 14 and 15 to a conveyor 17 moving down on the bottom of the main body 4. Said conveyor 17 empties through an opening of the main body 4. The few leaves that are still mixed with the stalk, fall to the ground during the flight of the dean stalk through air towards the semitrailer 6 hitched to the r-ear of the prime mover 5.

The above description of the invention also discloses the method aspect Whole Stalk Green Sugar Cane Cleaning System. The cleaning method objective of the present invention is to increase the quality of the whole cane and biomass to be free from loose soil and adhering mud, that could impair its milling, processing and utilization. A further objective of the present invention is to provide a high throughput, from 100 to 150 MTon./Hr., with no injury to the cane in order to preserve it from rapid bio-deterioration. A still further objective of this invention is a harvesting system that provides direct loading of the clean cane into other means of transport without the cane ever touching the ground, a harvesting system that can clear the advanced lanes of access into the field, a harvesting system that can work in wet ground, to extend the harvesting period and a maneuverable machine with little compaction.

Referring to FIG. 20 show the special semitrailer that is part of the harvesting system of this invention. The semitrailer 6 is comprised of two axles 180 operatively mounted in frame 181, both axles are tractive with hydraulic motors 182 in each end, to which the tires and rims 183 are mounted. From a cross member 184 of frame 181, two leaf springs 185 are mounted. The ends of said leaf springs 185 are attached to the two axles 180. Two heavy antiroll bars 186 are mounted with rubber bushings 187 to cross member 184, the ends of each antiroll bar being attached to each axle 180. The weight of the dump body 188 is carried by the frame and the leaf springs 185 and the antiroll bars 186 control the roll of the body while the semitrailer travel on uneven ground.

The side dump body 189 can operate to either side and is operated by two hydraulic cylinders 190. Said side dump body 189 is suspended in a cradle of the frame 181 and held with four rods 191 located in the four corners. If it is desired to dump to the right, two rods 191 from the left are withdrawn due to the action of two solenoids 192 to liberate movement between frame and dump body. When the hydraulic cylinders 190 are extended the body dumps to the right; when the hydraulic cylinders are contracted, the rods 191 are returned to their place. If the operation is reversed the body 189 will dump to the opposite side.

The dump body 189 provides temporary storage of as-harvested clean cane, until a load for other vehicle is completed within the dump body of the semitrailer. The dump body has a vertical division 194 in the middle, to form forward and rear compartments. The operator has different choices to fill the semitrailer with clean cane: he can fill partly the forward compartment by slowing the output velocity of the secondary cleaning rollers 15; if the output velocity of the secondary cleaning rollers 15 is increased, the rear compartment can be partly filled; or, the operator can adjust the output velocity of the secondary cleaning rollers to partially hit the vertical division 187 to fill both compartments at the same time.

The maneuverability of the machine so necessary for this application is unique due to the use of an articulated prime mover 5 and a hitch 195 between said prime mover 5 and the semitrailer 6.

I claim:

1. Apparatus for harvesting stalk-type crops such as sugar cane, the apparatus comprising:
    an articulated prime mover having a front end, relative to the direction of travel, with
    (a) a roller for bending the upper part of the stalks in the direction of travel,
    (b) at least two cooperating base cutters for cutting the base of the stalks proximate the ground, the severed stalk ends extending to the rear relative to the direction of travel, and
    (c) cooperative rollers for capturing the severed ends of the stalks and feeding the entire stalks rearwardly,
    the apparatus further including a cleaner positioned at the rear of said prime mover and operatively connected to said capturing and feeding rollers to receive and clean the entire stalks.

2. The apparatus as in claim 1, further including a topper assembly for topping the stalks prior to cutting the base of the stalks including
    (a) at least two cooperating topping cutters positioned forward of the bending roller;
    (b) paddle members associated with said topping cutters for directing the cut tops rearward; and
    (c) a conveyor operatively connected to receive the cut tops from said paddle members and convey the cut tops to a preselected side of said prime mover.

3. The apparatus as in claim 2, wherein said conveyor is a belt conveyor, and wherein said topper assembly is pivotable between a first position with said conveyor in an operative transverse orientation and a second position with said conveyor in a non-operative forward-rear orientation for transit.

4. The apparatus as in claim 1, wherein at least one of said base cutters includes a generally vertical rotatable drive shaft, said drive shaft extending below said respective cutter, and a spherically dished follower for engaging the ground and being mounted on the end of said drive shaft below said respective cutter for rotation independent of said drive shaft.

5. The apparatus as in claim 1, wherein said capturing and feeding rollers include at least three pairs of cooperating rollers operatively positioned to sequentially engage the severed ends of the stalks, the peripheral speeds of said second-to-engage roller pair being greater than said first-to-engage roller pair, and the peripheral speeds of said third-to-engage roller pair being greater than said second-to-engage roller pair.

6. The apparatus as in claim 5, wherein the peripheral speeds of the rollers in said first-to-engage roller pair are greater than the forward velocity of said prime mover.

7. The apparatus as in claim 1, wherein said cleaner includes an elongated housing connected and extending to the rear of said prime mover, the housing first section with a first series of cleaning rollers, said first series including a plurality of cooperating cleaning roller pairs operatively positioned to simultaneously act on the stalks when the stalks are in said first section, the peripheral speeds of the rollers in each pair being essentially constant, and the peripheral speeds of the roller pairs increasing in the rearward direction of travel of the stalks for tensioning the stalks.

8. The apparatus as in claim 7, wherein the cooperating rollers in each of said pairs are spaced apart by a clearance, and wherein the apparatus further includes means to simultaneously adjust the clearance between all the cooperating rollers in said first series.

9. The apparatus as in claim 7, including a motor wherein all the rollers in said first series are driven by said motor.

10. The apparatus as in claim 7, wherein said housing includes a second section positioned to receive stalks from said first section, wherein said second section includes a second series of cleaning rollers, said second series including a plurality of cooperating cleaning roller pairs having top and bottom rollers, said second series of rollers simultaneously acting on the stalks when the stalks are in said second section, the peripheral speed of each of said top rollers being different from the peripheral speed of the respective bottom roller.

11. The apparatus as in claim 10, wherein the peripheral speeds of all of said top rollers is equal and the peripheral speeds of all of said bottom rollers is equal.

12. The apparatus as in claim 10, wherein said peripheral speeds in said second series of cleaning rollers is adjustable to impart a selected velocity to the stalks.

13. The apparatus as in claim 1, wherein said cleaner includes at least one pair of cooperating top and bottom cleaning rollers arranged along the path of the stalks, and wherein the peripheral speed of said top roller is different from the peripheral speed of said bottom roller.

14. The apparatus as in claim 13, wherein said cleaner includes a sequential series of pairs of said cooperating top and bottom cleaning rollers wherein the peripheral speed of each top roller is different from the peripheral speed of each respective cooperating bottom roller.

15. The apparatus as in claim 14, wherein the peripheral speeds of all said top rollers is the same and the peripheral speeds of all said bottom rollers is the same.

16. The apparatus as in claim 11, further including a stalk-collecting trailer coupled to the rear of said prime mover and operatively configured to receive stalks discharged rearwardly from said cleaner, said trailer being a side dumping trailer.

17. The apparatus as in claim 16, wherein said trailer includes a base having forward and rear compartments separated by a vertical divider extending upward from the base, said divider being configured to intercept stalks discharged below a predetermined velocity, whereby the intercepted stalks fall into said forward compartment, and stalks not intercepted would fall into said rearward compartment.

18. A method for harvesting stalk-type crops comprising the steps of:

bending the stalks in a forward direction;

cutting the bent stalks at their base;

capturing the cut ends of the stalks;

feeding the entire cut stalks cut-end-first rearwardly;

receiving the fed whole stalks in an elongated housing having a stalk-receiving end and a stalk-discharging end, the housing also having at least one pair of opposed cooperating top and bottom rollers;

cleaning the whole stalks with said roller pair, said cleaning step including the step of driving the top roller at a different speed than the bottom roller.

19. The harvesting method as in claim 18, wherein the housing has a first section proximate the stalk-receiving housing end and a second section proximate the stalk-discharging housing end, the one cooperating roller pair being in the second section, the housing further defining a path of transit for the stalks, the first section including a sequence of first opposed cooperating cleaning roller pairs arrayed along the path of stalk transit, the cleaning step further including the step of driving each roller of each pair of the first roller pairs at the same peripheral speed, wherein the peripheral speeds of each next-in-sequence roller pair along the path of transit s greater than that of the preceding roller pair.

20. The harvesting method as in claim 19, wherein the second section includes a plurality of said pair of opposed cooperating top and bottom rollers, wherein all the top rollers of said plurality are driven at the same peripheral speed and all the bottom rollers are driven at the same peripheral speed.

* * * * *

UNITED STATES PATENT AND TRADEMARK OFFICE
CERTIFICATE OF CORRECTION

PATENT NO. : 5,463,856
DATED : November 7, 1995
INVENTOR(S) : Carlos A. Beckwith It is certified that error appears in the above-indentified patent and that said Letters Patent is hereby corrected as shown below:

Claim 19, col. 14, line 18, "s" should read --is--.

In the Abstract, line 11, "and-horizontal" should read --and horizontal--.

Signed and Sealed this

Thirtieth Day of January, 1996

Attest:

BRUCE LEHMAN

*Attesting Officer*  *Commissioner of Patents and Trademarks*